(12) United States Patent
Uraizee et al.

(10) Patent No.: US 11,492,300 B2
(45) Date of Patent: Nov. 8, 2022

(54) DRYING A COATING USING ELECTROMAGNETIC RADIATION OR HEATING OF DRUM

(71) Applicant: SABIC GLOBAL TECHNOLOGIES B.V., Bergen Op Zoom (NL)

(72) Inventors: Farooq Uraizee, Sugarland, TX (US); Danil Tirtowidjojo, Sugarland, TX (US); Jayachandran Chandrasekaran, Sugarland, TX (US); Ramesh Rameswaran, Sugarland, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 687 days.

(21) Appl. No.: 16/473,845

(22) PCT Filed: Dec. 19, 2017

(86) PCT No.: PCT/IB2017/058162
§ 371 (c)(1),
(2) Date: Jun. 26, 2019

(87) PCT Pub. No.: WO2018/122684
PCT Pub. Date: Jul. 5, 2018

(65) Prior Publication Data
US 2020/0385316 A1   Dec. 10, 2020

Related U.S. Application Data

(60) Provisional application No. 62/439,353, filed on Dec. 27, 2016.

(51) Int. Cl.
*C05C 9/00* (2006.01)
*B01D 53/00* (2006.01)
(Continued)

(52) U.S. Cl.
CPC ............ *C05C 9/005* (2013.01); *B01D 53/002* (2013.01); *B01J 2/006* (2013.01); *B05D 3/066* (2013.01);
(Continued)

(58) Field of Classification Search
CPC .. C05C 9/005; B01D 53/002; B01D 2256/22; B01D 2257/2064; B01D 2258/02;
(Continued)

(56) References Cited

U.S. PATENT DOCUMENTS 2,308,420 A * 1/1943 Hoopes .................... A23G 3/26
                                                    34/236
3,606,860 A    9/1971 Dunn, Jr.
(Continued)

FOREIGN PATENT DOCUMENTS

CN    86106765    5/1987
CN    1412160    4/2003
(Continued)

OTHER PUBLICATIONS

Office Action issued in counterpart Chinese Patent Application No. 201780087115.0, dated Sep. 16, 2020.
(Continued)

*Primary Examiner* — Gabriel E Gitman
(74) *Attorney, Agent, or Firm* — Norton Rose Fulbright US LLP

(57) ABSTRACT

Methods, systems, and apparatuses for coating a material by contacting the material with a coating material and a solvent are disclosed herein. The coated material can be obtained by evaporating the solvent: by heating the coated material directly or indirectly with electromagnetic radiation; by heating with heat generated from a heat source that heats an internal container for the material to be coated and/or coated material; and/or in an interior volume of a coating container
(Continued)

having a side wall, by heating a portion of the side wall of the coating container and/or internal container with a heat source that is positioned outside of the interior volume of the coating container.

18 Claims, 10 Drawing Sheets

(51) Int. Cl.
| | |
|---|---|
| *B01J 12/00* | (2006.01) |
| *B05D 3/06* | (2006.01) |
| *C05G 5/30* | (2020.01) |
| *B01J 2/00* | (2006.01) |

(52) U.S. Cl.
CPC ............ *C05G 5/37* (2020.02); *B01D 2256/22* (2013.01); *B01D 2257/2064* (2013.01); *B01D 2257/556* (2013.01); *B01D 2258/02* (2013.01)

(58) Field of Classification Search
CPC ....... B01D 2257/556; B01J 2/006; B01J 2/12; B05D 3/066; C05G 5/30; C05G 5/35; C05G 5/37; C05G 5/38; F26B 3/22; F26B 3/28; A23G 3/0095; A23G 3/26; A61J 3/005; A61K 9/50; A61K 9/5089
See application file for complete search history.

(56) References Cited

U.S. PATENT DOCUMENTS

| | | | | |
|---|---|---|---|---|
| 4,086,705 A | * | 5/1978 | Wehr .................. | B01D 5/0087 34/469 |
| 4,326,480 A | * | 4/1982 | Glatt ....................... | A23G 3/26 366/139 |
| 4,478,170 A | * | 10/1984 | Bridges ................. | B05B 17/00 425/222 |
| 4,594,266 A | | 6/1986 | Lemaire et al. | |
| 4,624,867 A | | 11/1986 | Iijima et al. | |
| 4,988,377 A | | 1/1991 | Manalastas et al. | |
| 5,399,186 A | * | 3/1995 | Derrah ..................... | B01J 2/16 71/64.11 |
| 5,501,874 A | * | 3/1996 | Yamamoto ................. | B01J 2/12 427/221 |
| 5,768,799 A | | 6/1998 | Delaunay et al. | |
| 6,770,298 B1 | * | 8/2004 | Debregeas ................. | B01J 2/12 424/490 |
| 7,624,666 B1 | * | 12/2009 | O'Neill .................. | B64D 33/04 89/1.11 |
| 7,836,842 B2 | * | 11/2010 | Hasegawa ........... | B05B 13/0257 118/30 |
| 2008/0289571 A1 | | 11/2008 | Isobe et al. | |
| 2015/0132484 A1 | * | 5/2015 | Forsythe .................. | B01J 2/006 118/69 |

FOREIGN PATENT DOCUMENTS

| | | |
|---|---|---|
| CN | 101292128 | 10/2008 |
| CN | 101949635 | 1/2011 |
| CN | 202044935 | 11/2011 |
| CN | 102620527 | 8/2012 |
| CN | 103090642 | 5/2013 |
| CN | 105026863 | 11/2015 |
| EP | 1769842 | 4/2007 |
| GB | 2028294 | 3/1980 |
| JP | H11-83333 | 3/1999 |
| WO | WO 2016/172039 | 10/2016 |

OTHER PUBLICATIONS

*Fertilizer development and processing.* 2nd edition, Zhengyin Wang eds., China Agricultural University Press, pp. 315-332.
*Fertilizer Handbook.* translated by the Institute of Science and Technology Information, Ministry of Chemical Industry, Guangxi Science and Technology Press, pp. 403-408.
Office Action issued in Corresponding Chinese Application No. 201780087115.0, dated May 17, 2021 (English Translation provided).
Search Report issued in Corresponding Chinese Application No. 201780087115.0, May 10, 2021 (No English translation provided).
Extended European Search Report issued in corresponding European Patent Application No. 17889086, dated Jul. 28, 2020.
International Search Report and Written Opinion Issued in Corresponding International Patent Application No. PCT/IB2017/058162, dated Apr. 5, 2018.

* cited by examiner

DRYING A COATING USING ELECTROMAGNETIC RADIATION OR HEATING OF DRUM

CROSS-REFERENCE TO RELATED APPLICATIONS

This application is a national phase application under 35 U.S.C. § 371 of International Application No. PCT/IB2017/058162, filed Dec. 19, 2017, which claims the benefit of priority of U.S. Provisional Application No. 62/439,353, filed Dec. 27, 2016. The contents of the referenced patent applications are incorporated in the present application by reference in their entirety.

BACKGROUND OF THE INVENTION

A. Field of the Invention

The present invention relates generally to the field of making coated materials such as coated fertilizers. More particularly, it concerns methods of using a heated coating container, a heated internal container (e.g., rotatable container, bed, or tray), and/or electromagnetic radiation to dry a coating material (e.g., coatings on fertilizer pellets).

B. Description of Related Art

Coating of materials for various solid fertilizer applications is typically performed in a rotating drum coater. Typically, the rotating drum coater agitates a bed of fertilizer particles while the particles are being coated. The coating process involves dissolving a coating material in a solvent to form a coating mixture and then spraying the coating mixture onto the fertilizer particles while they are being agitated. At the same time, the solvent is evaporated from the coating material to solidify the coating material onto the particles. In a conventional coater, evaporation of the solvent and drying of the coated particles is performed via moving heated sweep gas through the bed of particles while they are being agitated. The heated sweep gas provides heat for evaporating the solvent and acts as a carrier for evaporated solvent, but also produces a sweep gas enriched in solvent as a waste product that may need to be further processed to remove the solvent. Typically, the solvent-enriched sweep gas is cooled to condense and recover the solvent from the sweep gas. The equipment and energy required to condense and recover the solvent from the sweep gas can be extensive and expensive.

Use of heated sweep gas as the source of heat for drying the coated particles requires a large amount of energy, as the sweep gas must be heated to a temperature sufficient to evaporate the solvent material and/or maintain the temperature in the coater. In addition to the expenses associated with the use of a large amount of energy, the heated sweep gas often causes pre-drying of the coating material before it contacts the material to be coated. This can make spraying the coating material challenging and costly by reducing the quality of the coating, wasting coating material, and/or clogging the coating material sprayers.

SUMMARY OF THE INVENTION

A solution to the aforementioned problems associated with using heated sweep gas as a heat source for evaporating solvent from coated materials has been discovered. The solution is premised on the use of 1) heat from a heat source to evaporate the solvent and dry the coated materials, and 2) use of a sweep gas as a carrier for evaporated solvent. The methods/apparatus contemplated herein avoid the use of sweep gas as the only heat source to heat the coated materials and/or evaporate the solvent, but uses the sweep gas as a carrier for the evaporated solvent. For example, this can be achieved by heating the coated material, coating container, and/or an internal container that is configured to hold coated and/or uncoated material and is positioned in the interior volume of the coating container with: (i) electromagnetic radiation; (ii) heat generated from an external heat source that is positioned outside of the interior volume of the coating container and is configured to heat a portion of the side wall of the coating container and/or internal container; (iii) and/or heat generated from a heat source positioned in the interior volume of the coating container that heats the internal container. A benefit of this discovery is that the sweep gas does not have to be heated to a temperature that would evaporate solvent from the coated materials. Instead of heating a large volume of sweep gas, the evaporation process can be implemented through the electromagnetic radiation, external heating source(s), and/or heating the internal container, which are more energy efficient as they can be designed to directly heat the solvent, material to be coated, coating material, and/or coated material rather than the entire volume of sweep gas. Even further, the amount of sweep gas used can be reduced in the processes of the present invention, as the sweep gas is not the source of heat to evaporate solvent. Therefore, less sweep gas is needed to remove evaporated solvent from the container. Accordingly, the effective concentration of the evaporated solvent in the sweep gas can be higher than that of the sweep gas in the conventional processes where a higher volume of sweep gas is used. Therefore, it is much easier to the separate and recover the coating solvent from the sweep gas based on methods described herein. Further, and in certain non-limiting aspects of the invention, heating sources can be positioned downstream from the coating process; thereby reducing or avoiding the issues seen with pre-drying materials via heated sweep gas. Thus, the present invention provides for a more energy efficient process for evaporating solvent and/or reduces or avoids issues seen with pre-heating the coating material or a material to be coated. In preferred aspects of the present invention, the material to be coated can be fertilizer particles, thereby reducing the overall costs associated with producing fertilizers or any other materials to be coated.

In aspects of the invention, a method for coating a material is described. The method can include (a) contacting the material with a composition containing a coating material and a solvent to obtain a coated material, (b) evaporating solvent from the coated material in an interior volume of a coating container having a side wall by heating the coated material, coating container, and/or an internal container that is configured to hold coated and/or uncoated material and is positioned in the interior volume of the coating container (i) with electromagnetic radiation, (ii) with heat generated from an external heat source that is positioned outside of the interior volume of the coating container and is configured to heat a portion of the side wall of the coating container and/or internal container, (iii) and/or with heat generated from a heat source positioned in the interior volume of the coating container that heats the internal container, and (c) removing evaporated solvent from the interior volume of the coating container by contacting the evaporated solvent with a sweep gas to produce a solvent-enriched sweep gas and removing the solvent-enriched sweep gas from the interior volume of the coating container. The method can allow the amount of sweep gas used to remove the evaporated solvent from the coating container to be less than the amount of sweep gas used to remove the same amount of evaporated solvent if the solvent is evaporated by using heated sweep gas without using step (b). In some instances, the amount of sweep gas used to remove the evaporated solvent can be 0.8 metric tons (MT) of sweep gas/(hr×MT of material to be coated) to 2.5 MT of sweep gas/(hr×MT of material to be coated). In some instances, the temperature of the sweep gas can be 40° C. to 150° C. prior to contacting the evaporated solvent. In some instances, the temperature of the sweep gas can be 40° C. to 130° C. prior to contacting the evaporated solvent. In some instances, the temperature of the sweep gas used in step (c) can be a temperature or a range of temperatures sufficient to evaporate the solvent. In some instances, the temperature of the sweep gas used in step (c) can be a temperature or a range of temperatures sufficient to maintain a coating apparatus at a temperature capable of evaporating the solvent. In some instances, the temperature of the sweep gas used in step (c) can be a temperature or a range of temperatures suitable for coating a fertilizer. In some instances, the temperature of the sweep gas used in step (c) can be a temperature or a range of temperatures suitable for coating urea.

In some aspects, a heat source uses electromagnetic radiation to evaporate the solvent from the coated material. The electromagnetic radiation can include ultraviolet radiation and/or infrared radiation. In some instances, the electromagnetic radiation is selected to heat metal, commonly known as inductive heating, selected to heat water, such as ultra-high frequency (UHF) microwaves, and/or selected to heat the material to be coated, the solvent, and/or the coating material. In some instances, the electromagnetic radiation can be selected to heat urea. In some instances, the electromagnetic radiation can be selected to heat metal of the coating container and/or the internal container (e.g., bed, tray, or rotating drum). In some instances, the electromagnetic radiation can include electromagnetic radiation with 100 to 400 kHz frequency. In some instances, the coated material can be contacted with the electromagnetic radiation at and/or downstream from where the coating material contacts the material in step (a). In some instances, the material to be coated can be contacted with the electromagnetic radiation upstream, at, or downstream of where the coating material contacts the material to be coated in step (a). In some instances, the coating container, internal container, apparatus, and/or portion thereof, can be contacted with the electromagnetic radiation upstream, at, or downstream of where the coating material contacts the material to be coated in step (a).

In some aspects, to evaporate the solvent, the coated material can be contacted with heat generated from a heat source positioned outside of the interior volume of the coating container. The heat source can be positioned at and/or downstream from where the coating material contacts the material to be coated in step (a). In some instances, the heat source contacts the side wall of the coating container, is in the side wall of the coating container, and/or is located external to the side wall of the coating container.

In some aspects, to evaporate the solvent, the coated material can be contacted with heat generated from a heat source that heats an internal container positioned in the interior volume of the coating container. The internal container can be configured to hold coated and/or uncoated fertilizer particles. The heat source can be positioned at and/or downstream from where the coating material contacts the material to be coated in step (a). In some instances, the heat source is in the container, contacts the internal container, and/or is located external to the internal container.

In some aspects, the coating container and/or internal container, or a portion thereof, is capable of agitating the coated material and/or material to be coated. In some instances, the coating container and/or internal container, or portion thereof, rotates and/or oscillates during at least coating step (a) and heating step (b).

In some aspects, the method further includes removing at least a portion of the evaporated solvent from the solvent-enriched sweep gas to form a recovered sweep gas. In some instances, the at least a portion of the evaporated solvent can be removed through any methods known in the art. In some instances, at least a portion of the evaporated solvent can be removed by condensation, absorption, distillation, etc. In some instances, the method of removing at least a portion of the evaporated solvent includes directly contacting the solvent-enriched sweep gas with an aqueous liquid containing 50% wt/wt or more water to condense evaporated solvent into the aqueous liquid to form a solvent-enriched aqueous solution. In some instances, at least a portion of the recovered sweep gas can be used in step (c). In some instances, at least a portion of the recovered sweep gas can be used in other processes in the same or a different plant.

In some aspects, the condensed solvent can be separated from the solvent-enriched aqueous solution to form a recovered solvent stream and a recovered aqueous liquid. In some instances, at least a portion of the recovered solvent stream can be used in coating step (a). In some instances, at least a portion of the recovered solvent stream can be used in other processes in the same or a different plant. In some instances, at least a portion of the aqueous liquid used to condense the evaporated solvent can be recovered aqueous liquid. In some instances, the condensed solvent can be separated from the water in the solvent-enriched aqueous solution by any method known in the art. In some instances, separation occurs by contacting the solution with steam to evaporate the condensed solvent. In some instances, the separation occurs spontaneously. In some instances, the method can include a step of reducing the amount of water in the recovered solvent stream.

In some aspects the sweep gas can include nitrogen ($N_2$), argon (Ar), helium (He), carbon dioxide ($CO_2$), oxygen ($O_2$), air, flue gas, or any combination thereof. In some instances, the sweep gas is a flue gas from another part of a plant that uses the methods and/or apparatuses described herein. In some instances, the flue gas contains $CO_2$, $N_2$, and $O_2$. In some instances the sweep gas used in the coating method contains or is entirely recovered sweep gas.

In some aspects, the solvent includes an organic solvent. In some instances the solvent includes chloroform, toluene, methylene chloride, acetonitrile, chlorobenzene, 1,1,2-trichloroethane, dichlorobenzene, methylethyl ketone, or any mixture thereof.

In some aspects, the material to be coated and/or the coated material is in particulate form. In some instances, the material to be coated is a solid. In some instances, the material to be coated and/or the coated material is a powder.

In some instances, the material to be coated and/or the coating material contains or one or more fertilizer(s). In one instance, the fertilizer includes urea.

In aspects of the invention, a system for coating a material is described. The system can include any one of, any combination of, or all of a coating container, a sweep gas recovery apparatus, and/or an aqueous liquid/solvent recovery apparatus. Each of these aspects of the system can be coupled to one another (e.g., they can be in fluid communication with one another such as through various inlets, outlets, and/or valves). By way of example, solvent-enriched sweep gas can be directed from the coating container to the sweep gas recovery apparatus, which can separate sweep gas from the solvent via an aqueous liquid. The solvent in the aqueous liquid can then be directed to the aqueous liquid/solvent recovery apparatus to separate the solvent from the aqueous liquid. Non-limiting examples of various features that each of the coating container, sweep gas recovery apparatus, and aqueous liquid/solvent recovery apparatus can have are provided in the description of illustrative embodiments section and/or in FIGS. 1-7. With respect to the coating container, it can include (i) an inlet for sweep gas to enter the interior volume of the coating container, (ii) a coating applicator (e.g., nozzle(s) that can be configured to apply coating to a material such as fertilizer particles), (iii) a heating source that can be configured to evaporate solvent from the coated material, and (iv) an outlet that can be configured to remove solvent-enriched sweep gas from the coating container. The heating source can be an electromagnetic radiation source that is configured to emit electromagnetic radiation to heat coated particles, thereby evaporating solvent from the coated particles. In particular instances, the electromagnetic radiation source is positioned downstream from the coating applicator. The heating source can be an external heating source that is positioned outside of the interior volume of the coating container and is configured to heat a portion of the side wall of the container and/or the internal container, the heated side wall then providing sufficient heat to evaporate solvent from the coated material. In particular instances, the external heating source can be positioned downstream from the coating applicator. The heating source can be an internal heating source positioned in the interior volume of the coating container and configured to provide heat to an internal container (e.g., bed, tray, drum, rotatable drug) that is configured to hold coated and/or uncoated material, the heated internal container then providing sufficient heat to evaporate solvent from the coated material. In some instances, the heating source is located internal to the container but external to the internal container. In particular instances, the internal heating source can be positioned downstream from the coating applicator. Notably, the coating container can include any one of, any combination of, or all of the aforementioned heating sources.

In a certain aspect of the invention 20 embodiments are described. Embodiment 1 is a method for coating a material, the method comprising: (a) contacting the material with a coating material and a solvent to obtain a coated material; (b) evaporating solvent from the coated material in an interior volume of a coating container having a side wall by heating the coated material, coating container, and/or an internal container that is configured to hold coated and/or uncoated material and is positioned in the interior volume of the coating container (i) with electromagnetic radiation, (ii) with heat generated from an external heat source that is positioned outside of the interior volume of the coating container and is configured to heat a portion of the side wall of the coating container and/or internal container, (iii) and/or with heat that heats the internal container, the heat being generated from a heat source positioned in the interior volume of the coating container and external to the internal container; and (c) removing evaporated solvent from the interior volume of the coating container by contacting the evaporated solvent with a sweep gas to produce a solvent-enriched sweep gas and removing the solvent-enriched sweep gas from the interior volume of the coating container. Embodiment 2 is the method of embodiment 1, wherein the amount of sweep gas used to remove the evaporated solvent is 0.8 MT of sweep gas/(hr×MT of material to be coated) to 2.5 MT of sweep gas/(hr×MT of material to be coated). Embodiment 3 is the method of any one of embodiments 1 to 2, wherein the amount of sweep gas used to remove the evaporated solvent from the coating container is less than the amount of sweep gas used to remove the same amount of evaporated solvent if the solvent is evaporated by using heated sweep gas without using step (b). Embodiment 4 is the method of any one of embodiments 1 to 3, wherein the temperature of the sweep gas is 40° C. to 150° C. prior to contacting the evaporated solvent. Embodiment 5 is the method of any one of embodiments 1 to 4, wherein the coated material is contacted with the electromagnetic radiation to evaporate the solvent from the coated material and the electromagnetic radiation comprises ultraviolet radiation and/or infrared radiation. Embodiment 6 is the method of any one of embodiments 1 to 5, wherein the coated material is contacted with the electromagnetic radiation to evaporate the solvent from the coated material and an electromagnetic radiation source is positioned downstream from where the coating material contacts the material to be coated in step (a). Embodiment 7 is the method of any one of embodiments 1 to 6, wherein the coated material is contacted with heat generated from the heat source that is positioned outside of the interior volume of the coating container to evaporate the solvent and the heat source is positioned downstream from where the coating material contacts the material to be coated in step (a). Embodiment 8 is the method of any one of embodiments 1 to 7, wherein the coated material is contacted with heat that heats the internal container, the heat being generated from a heat source positioned in the interior volume of the coating container and external to the internal container, and wherein the heat source is positioned downstream from where the coating material contacts the material to be coated in step (a). Embodiment 9 is the method of any one of embodiments 1 to 8, wherein the coating container, internal container, or a portion thereof, rotates and/or oscillates during at least coating step (a) and heating step (b). Embodiment 10 is the method of any of embodiments 1 to 9, further comprising removing at least a portion of the solvent from the solvent-enriched sweep gas by contacting the solvent-enriched sweep gas with an aqueous liquid comprising 50% wt/wt or more water to condense the solvent into the aqueous liquid to form a solvent-enriched aqueous solution. Embodiment 11 is the method of embodiment 10, further comprising separating the condensed solvent from the solvent-enriched aqueous solution to form a recovered solvent stream and a recovered aqueous liquid. Embodiment 12 is the method of embodiment 11, further comprising using at least a portion of the recovered solvent stream in coating step (a). Embodiment 13 is the method of any of embodiments 11 to 12, further comprising using at least a portion of the recovered aqueous liquid as at least a portion of the aqueous liquid comprising water used to condense the evaporated solvent. Embodiment 14 is the method of any of embodiments 10 to 13, wherein the condensed solvent is separated from the solvent-enriched aqueous solution by contacting the solution with steam to evaporate the condensed solvent. Embodiment 15 is the method of any of embodiments 1 to 14, wherein the sweep gas comprises nitrogen ($N_2$), argon (Ar), helium (He), carbon dioxide ($CO_2$), oxygen ($O_2$), air, flue gas, or any combination thereof. Embodiment 16 is the method of any of embodiments 1 to 15, wherein the solvent is an organic solvent. Embodiment 17 is the method of embodiment 16, wherein the solvent is chloroform, toluene, methylene chloride, acetonitrile, chlorobenzene, 1,1,2-trichloroethane, dichlorobenzene, methylethyl ketone, or any combination thereof. Embodiment 18 is the method of any one of embodiments 1 to 17, wherein the coated material is a particulate. Embodiment 19 is the method of any one of embodiments 1 to 18, wherein the material to be coated and/or coating material in step (a) comprises a fertilizer. Embodiment 20 is the method of embodiment 19, wherein the fertilizer comprises urea.

Definitions of various terms and phrases used throughout this specification follow.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer. Non-limiting examples of such agents include biostimulants, urease inhibitors, and nitrification inhibitors. In some particular instances, the fertilizer is urea such as urea particles.

The terms "particulate" or "particle" are defined as an unconnected object that has a volume and mass. The volume can be defined or limited in size, such as a maximum, mean, median, minimum, etc. diameter, circumference, radius, volume, surface area, etc. In some embodiments herein, a "particulate" or "particle" is a solid.

The term "powder" is defined as a dry matter made of solid particles.

The use of the words "a" or "an" when used in conjunction with the term "comprising," "including," "containing," or "having" in the claims or the specification may mean "one," but it is also consistent with the meaning of "one or more," "at least one," and "one or more than one."

The terms "about" or "approximately" are defined as being close to as understood by one of ordinary skill in the art. In one non-limiting embodiment the terms are defined to be within 10%, preferably within 5%, more preferably within 1%, and most preferably within 0.5%.

The terms "wt. %", "vol. %", or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "reducing" or any variation of this term, when used herein includes any measurable decrease or complete reduction to achieve a desired result.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods and systems of the present invention can "comprise," "consist essentially of," or "consist of" particular steps, components, compositions, etc. disclosed throughout the specification. With respect to the transitional phrase "consisting essentially of," in one non-limiting aspect, a basic and novel characteristic of the methods and systems of the present invention are their abilities to produce coated fertilizers in an energy efficient manner.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The following drawings form part of the present specification and are included to further demonstrate certain non-limiting aspects of the present invention. The invention may be better understood by reference to one or more of these drawings in combination with the detailed description of specific embodiments presented herein.

Figure 1:
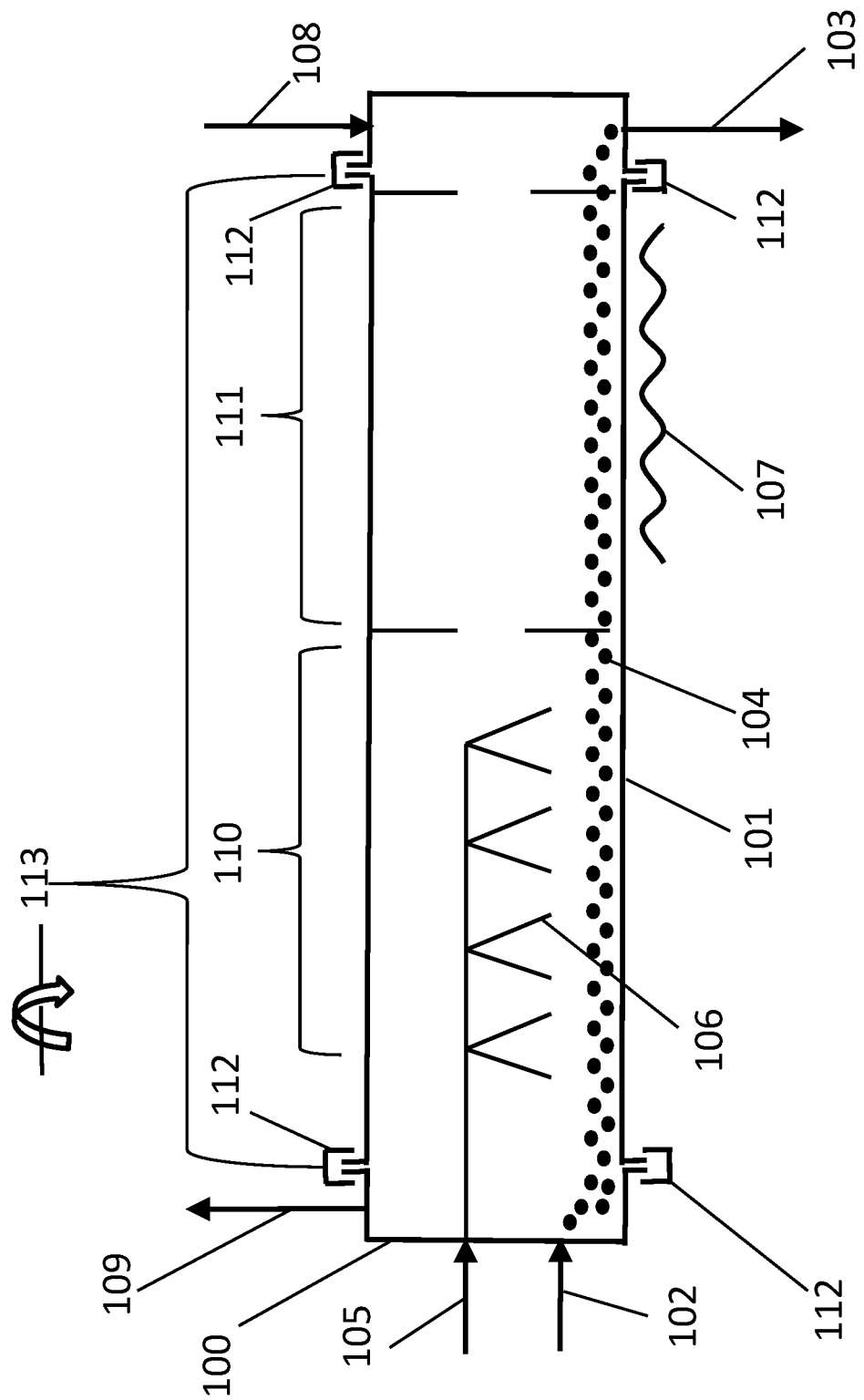
FIG. 1 is a schematic of a system for coating a material and drying the coating on the coated material using electromagnetic radiation, according to embodiments of the invention.

While the invention is susceptible to various modifications and alternative forms, specific embodiments thereof are shown by way of example in the drawings and may herein be described in detail. The drawings may not be to scale.

DESCRIPTION OF ILLUSTRATIVE EMBODIMENTS

The present disclosure concerns systems, methods, and apparatuses relating to producing a coated material that solves the problems associated with producing coated material via the use of sweep gas that is heated to a temperature sufficient to evaporate solvent from coatings. The benefits of the systems, methods, and apparatuses disclosed herein include, but are not limited to, reducing the amount of sweep gas, energy, and/or costs associated with typical coating processes. In embodiments of the present invention, a coating apparatus provides heat for evaporation of a solvent by using electromagnetic radiation, a heater that heats at least a portion of the side wall of an apparatus/coating container and/or an internal container, and/or a heater that heats an internal container, the heater being positioned in the interior volume of the coating apparatus/container. The coated material may be used as or in the production of fertilizers, water treatment products, cosmetics, pharmaceuticals, catalyst production, etc.

These and other non-limiting aspects of the present invention are provided in more detail in the following sections.

A. Process to Coat a Material

Methods to coat a material are described herein. A method to coat a material, according to embodiments of the invention, may include dissolving coating material in solvent to form a coating mixture. The coating mixture may then be used to contact the material to be coated. Contacting the coating mixture with the material to be coated may include spraying the coating mixture on the material to be coated while the material to be coated is being agitated.

Alternatively or additionally, other methods of contacting may be utilized, such as submerging the material to be coated in the coating mixture and draining the excess coating mixture from the material to be coated. In certain instances, the coating material (in solid form) may be allowed to contact at least some of the material to be coated, e.g., by placing coating material and the material to be coated, both in solid form, in a drum coater and then dissolving the coating material by adding a solvent. The solvent may solubilize the coating material, form the coating mixture, and thereby distribute the coating material over the particles of the material to be coated. In certain instances, the coating material (in solid form) may be allowed to contact at least some of the material to be coated at the same time solvent contacts the material to be coated. The solvent may then dissolve the coating material to form the coating mixture, where the formation of the coating mixture may be aided by agitation of material in the drum coater.

Thus, the coating material can be dissolved and/or suspended in a solvent before, during, or after contacting the material to be coated. Once the mixture is contacted with the material to be coated, the method may include evaporating the solvent from the coated material by heating the coating container, internal container, solvent, coated material, material to be coated, and/or coating material directly with electromagnetic radiation, indirectly by heating at least a side wall of the coating container and/or internal container using a heat source that is positioned outside of the interior volume of the coating container, and/or with heat generated from a heat source that heats an internal container for the coated material and/or material to be coated, the internal container being positioned in the interior volume of the coating container. Sweep gas can be used to aid in the evaporation of the solvent and/or to carry the evaporated solvent away from the coated material.

The material to be coated can contact the coating material by any methods known in the art. In some instances, the coating material is sprayed onto the material to be coated. In some instances, the coating material is mixed with the material to be coated before or during evaporation of the solvent. The material to be coated and/or the coated material can have any shape. Non-limiting examples of shapes include particles (spherical), sheets, blocks, drops, pellets, bars, amorphous forms, etc. In some aspects, the shape is a particulate. The particulate can be, but is not limited to, particle(s) have an average diameter of less than 5 cm, less than 1 cm, less than 1 mm, less than 500 µm, less than 100 µm, less than 500 nm, less than 100 nm, less than 1 nm, or any range therein. In some instances, the material to be coated is a powder.

In some instances the coating apparatus, a portion thereof, or an apparatus in the coating apparatus can be configured to agitate the material to be coated and/or the coated material. In some instances, the apparatus is capable of agitating during the coating step and/or heating step. In some instances, agitating can include flowing the sweep gas through a bed of the material to be coated. In some instances, the coating apparatus, a portion thereof, or an apparatus in the coating apparatus rotates to move and/or agitate the material to be coated and/or the coated material.

1. Material to be coated and coating material

The material to be coated and/or coating material can include solids, liquids, and mixtures thereof. In some instances, the material to be coated and or coating material contains an active ingredient. In some instances, the active ingredient is one or more fertilizer(s) such as, but not limited to, urea. In some instances the coating material and or material to be coated includes a polymer. In some instances, the coating material includes a material capable of forming a film. In some instances, the coating material includes biodegradable substances. In some instances, the coating material is polylactic acid (PLA) and/or polybutylene succinate (PBS).

2. Solvent

In embodiments of the invention, the evaporation of a solvent from a coated material can form a dry coated material. Further, the evaporation of the solvent can occur at the same time and/or after the coating material contacts the material to be coated.

In embodiments of the invention, the solvent can be an organic or inorganic, polar or non-polar, and/or miscible or non-miscible in water. The solvent can be a mixture of solvents. In some instances the solvent is chloroform, toluene, methylene chloride, acetonitrile, chlorobenzene, 1, 1, 2-trichloroethane, dichlorobenzene, methylethyl ketone, or any blend or mixture thereof. In some instances, recovered solvent and/or aqueous-enriched solvent solution produced from recovery of solvent from a solvent-enriched sweep gas can replace all or part of the solvent entering a coating process, such as a fertilizer coating process.

3. Sweep gas

A sweep gas can be used in the systems, apparatuses, and methods disclosed herein to remove an evaporated solvent and/or assist in the evaporation of a solvent. In some instances, the sweep gas can be any inert gas or non-inert gas capable of carrying the evaporated solvent used or generated. In some aspects, the sweep gas contains nitrogen ($N_2$), argon (Ar), helium (He), carbon dioxide ($CO_2$), oxygen ($O_2$), air, flue gas, or any mixture of blend thereof. The flue gas can be from another part of the same plant or another plant. The flue gas can contain $CO_2$, $N_2$, and $O_2$, or any mixture of blend thereof. In some instances, recovered sweep gas can replace all or part of the sweep gas entering a coating process, such as a fertilizer coating process. The recovered sweep gas can be produced by any of the methods, apparatuses, or systems described herein or known in the art.

In some instances, the use of the methods, apparatuses, and systems disclosed herein allow for use of less sweep gas than the amount of sweep gas used to remove the same amount of evaporated solvent if the solvent is evaporated by using heated sweep gas without using one or more of the steps and/or apparatuses disclosed herein. In some instances the amount of sweep gas used is 0.8 MT of sweep gas/(hr× MT of material to be coated) to 2.5 MT of sweep gas/(hr× MT of material to be coated). In embodiments of the invention, a reduced amount of sweep gas can be used as compared to conventional systems by relying on one or more methods, other than the flow of sweep gas, to transfer heat to the solvent. For example, as described herein, the heat transfer to the solvent may be implemented by using electromagnetic radiation directly or indirectly through heating the coating container and/or an internal container, the internal container being positioned in the interior volume of the coating container, a heater external to the internal compartment of the coating container that heats at least a portion of the side wall of the coating container and/or internal container, and/or with heat generated from a heat source internal to the internal compartment of the coating container that heats an internal container. In some instances, the amount of the sweep gas used to contact the evaporated solvent is in the range of 0.8 to 2.5 MT/(hr×MT of material to be coated), including ranges and values therein, for example, 0.8, 0.9, 1.1., 1.2, 1.3, 1.4, 1.5, 1.5, 1.7, 1.8, 1.9, 2.0, 2.1, 2.2, 2.3, 2.4, or 2.5 MT/(hr×MT of material to be coated) or any range therein. The flow of the sweep gas can vary depending on the conditions and/or requirements of the process in which it is being used.

In some aspects, an advantage of the processes described herein is the use of a reduced amount of sweep gas compared to that used in conventional processes. In some instances, using a reduced amount of sweep gas can increase the effective concentration of the solvent in the sweep gas in comparison to the effective concentration of the solvent in sweep gas used in conventional processes. In some instances, the increased amount of solvent in the sweep gas enables the solvent to be more easily condensed out of the sweep gas. In some instances, the solvent can be condensed out of the sweep gas by traditional condensation techniques and/or condensation with an aqueous liquid as described herein.

The temperature of the sweep gas before and/or during contact with the solvent to be evaporated can be a temperature sufficient to carry and/or evaporate the solvent. In some instances, the temperature of the sweep gas while contacting the evaporated solvent can be in the range of 40° C. to 150° C. In some instances, the temperature of the sweep gas while contacting the evaporated solvent can be in the range of 40° C. to 130° C. In some instances, the temperature of the sweep gas is more than 150° C., is 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., is less than 40° C., or is any temperature or range therein. The temperature of the sweep gas can vary depending on the conditions, solvents, and/or requirements of the process in which it is being used. In some instances, the temperature of the sweep gas is sufficient to heat a coating apparatus and/or system to a temperature within the range of 40° C. to 150° C. In some instances, the temperature of the sweep gas is sufficient to heat a coating apparatus and/or system to a temperature within the range of 40° C. to 130° C. In some instances, the temperature of the sweep gas is suitable for one or more solvents. In some instances, the temperature of the sweep gas is suitable for coating a fertilizer. In some instances, the fertilizer is urea. In some instances, the fertilizer is urea and the temperature of the sweep gas is sufficient to heat a coating apparatus and/or system to a temperature within the range of 40° C. to 130° C. or any range therein.

4. Drying using electromagnetic radiation

The coating container, internal container, coated material, solvent, coating material, and/or material to be coated can be contacted with electromagnetic radiation capable of heating the coating container, internal container, material to be coated, coating material, coated material, and/or the solvent to evaporate the solvent from the coated material. More than one wavelength of electromagnetic radiation can be used. Use of electromagnetic radiation provides the advantage of directly heating the surface/material/solvent/etc., without requiring contact with the source of electromagnetic radiation. The amount and wavelength(s) of the electromagnetic radiation can vary depending on the conditions and/or requirements of the process in which it is being used. The wavelength(s) of the electromagnetic radiation can include, but are not limited to wavelengths from 10 pm to 10 km or any range therein. In some instances, the electromagnetic radiation can include microwave, visible light, ultraviolet, and/or infrared radiation. In some instances, the electromagnetic radiation is selected to heat the metal, commonly known as inductive heating, selected to heat water, such as ultra-high frequency (UHF) microwaves, and/or selected to heat the material to be coated, the solvent, and/or the coating material. In some instances, the electromagnetic radiation is selected to heat urea. In some instances, the electromagnetic radiation can include electromagnetic radiation with 100 to 400 kHz frequency, or greater than, equal to, or between any two of 100, 150, 200, 250, 300, 350, and 400 kHz. In some preferred embodiments, the electromagnetic radiation is ultraviolet and/or infrared radiation. In a more preferred embodiment, the electromagnetic radiation is ultraviolet radiation.

The material to be coated can be exposed to the electromagnetic radiation before being contacted with the coating material and/or solvent and/or any time thereafter. The coated material can be exposed to the electromagnetic radiation at the same time that the material to be coated is contacted by the coating material and/or solvent and any time thereafter. The coating container, internal container, apparatus, and/or portion thereof can be exposed to the electromagnetic radiation at the same location that the material to be coated is contacted by the coating material and/or solvent and any time before or thereafter. In some instances, the coated material is contacted with electromagnetic radiation downstream from where the coating material contacts the material to be coated. In this way, inadvertent exposure of solvent and coating material to electromagnetic radiation before it contacts the material being coated may be avoided.

5. Drying using heating external to the internal chamber

To evaporate the solvent from the coated material, the coated material and/or material to be coated can be exposed to heat generated from a heat source that is positioned outside of the interior volume of a coating container containing the coated material and/or the material to be coated. The heat source can be any heat source known in the field, including steam, electrical heaters, fuel burning heat sources, heat generated from other processes at the same or a different plant, etc.

In some instances, the heat source can be positioned upstream, at, and/or downstream from where the coating material contacts the coated material. In some instances, the heat source heats and/or contacts the side wall of the coating container, is in the side wall of the coating container, and/or is external to the side wall of the coating container.

6. Drying using heating of an internal container that is located in the internal chamber To evaporate the solvent from the coated material, the coated material and/or material to be coated can be exposed to heat generated from a heat source that can be configured to heat an internal container for the coated material and/or material to be coated. The internal container can be located in the internal chamber of the coating container. The heat source can be any heat source known in the field, including steam, electrical heaters, fuel burning heat sources, heat generated from other processes at the same or a different plant, etc.

In some instances, the heat source can be positioned upstream, at, and/or downstream from where the coating material contacts the coated material. In some instances, the heat source heats and/or contacts the internal container, is internal to the container, and/or is external to the internal container but internal to the container.

B. Apparatus to Coat a Material

Figure 2:
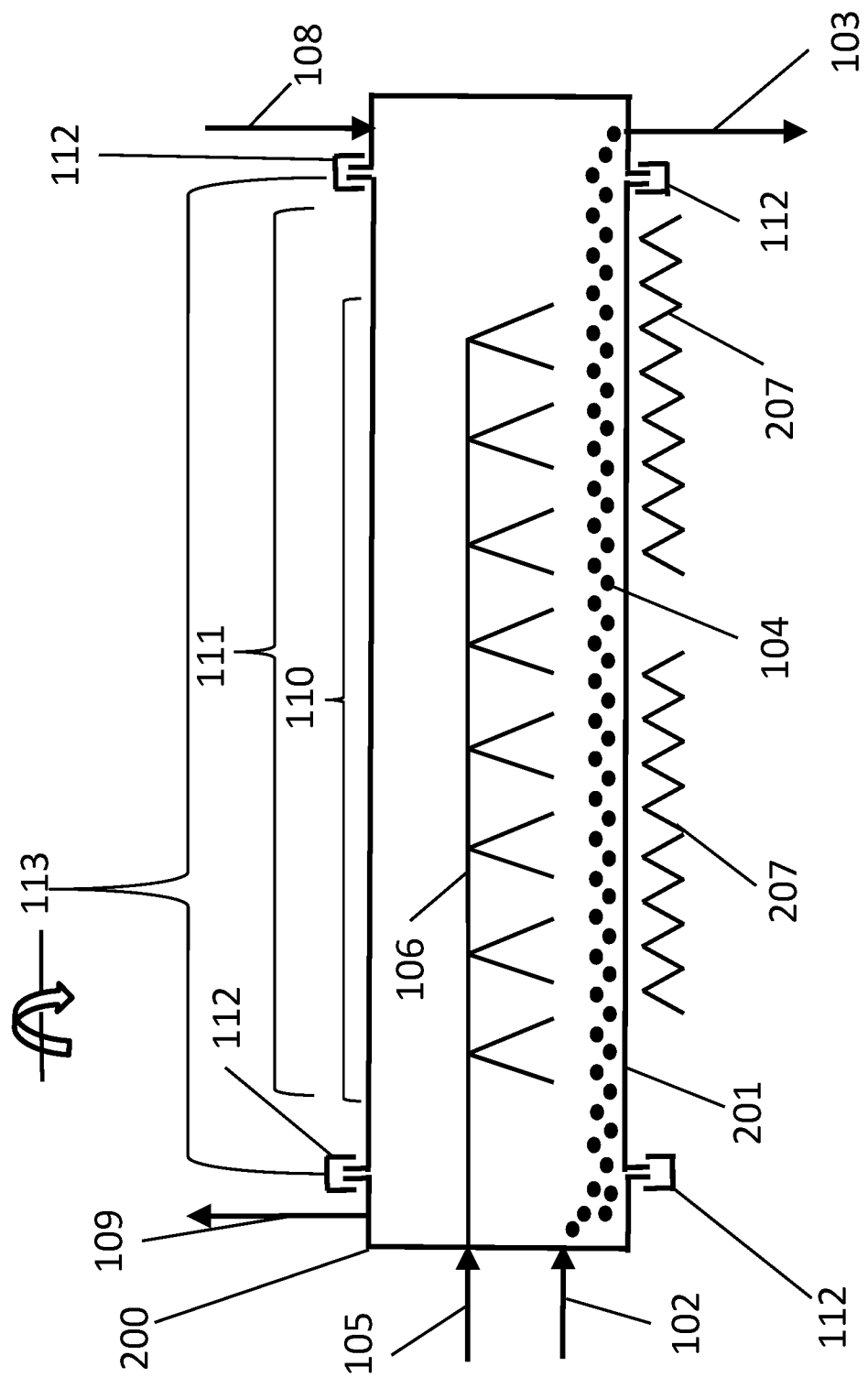
FIG. 2 is a schematic of a system for coating a material and drying the coating on a coated material using an external heating source that heats a side wall of a coating container and/or internal container containing the coated material, according to embodiments of the invention.
Figure 3:
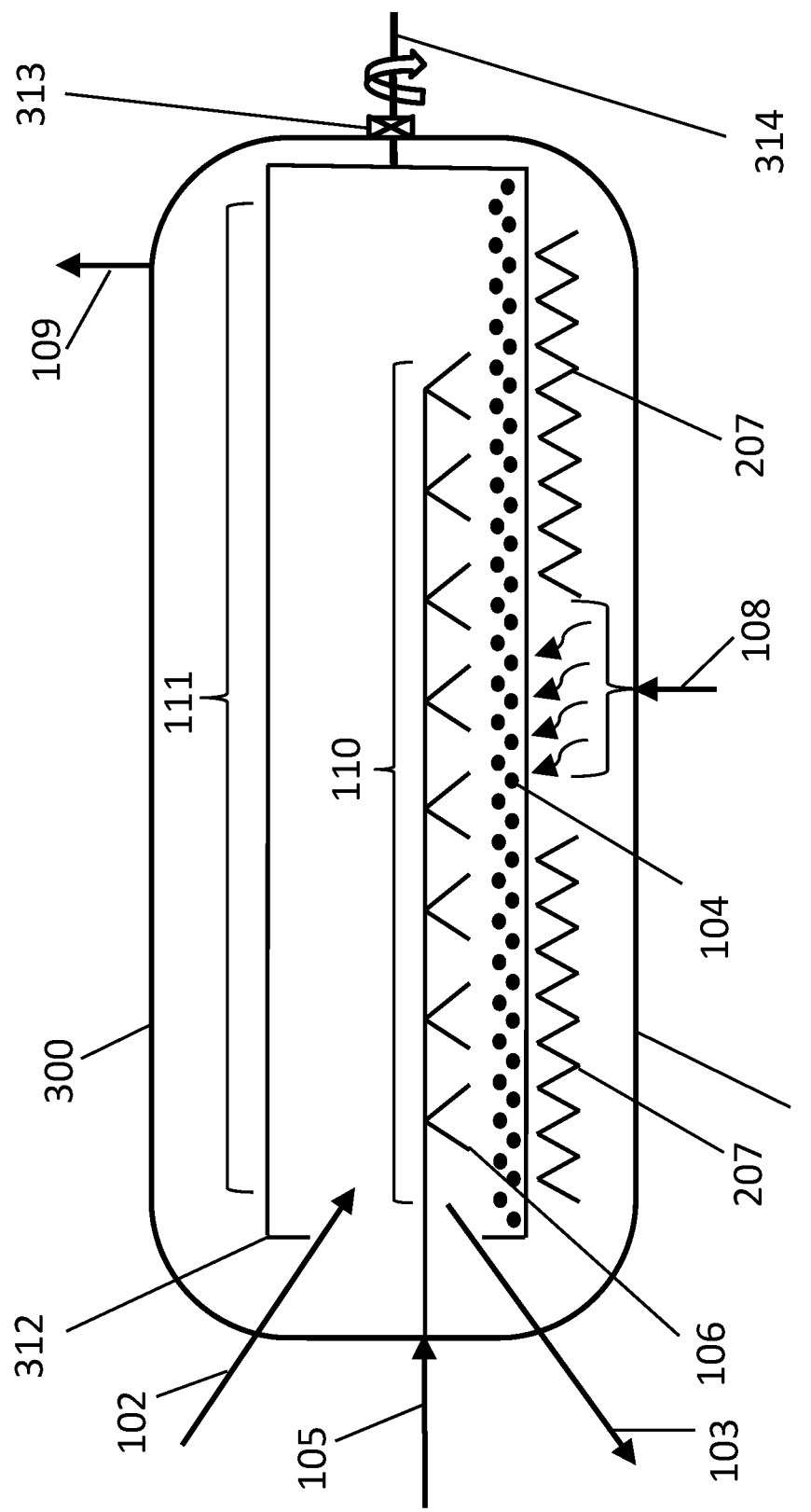
FIG. 3 is a schematic of a system for coating a material and drying the coating on a coated material using a heating source that heats an internal container positioned in the interior volume of the coating container, according to embodiments of the invention.
Figure 4:
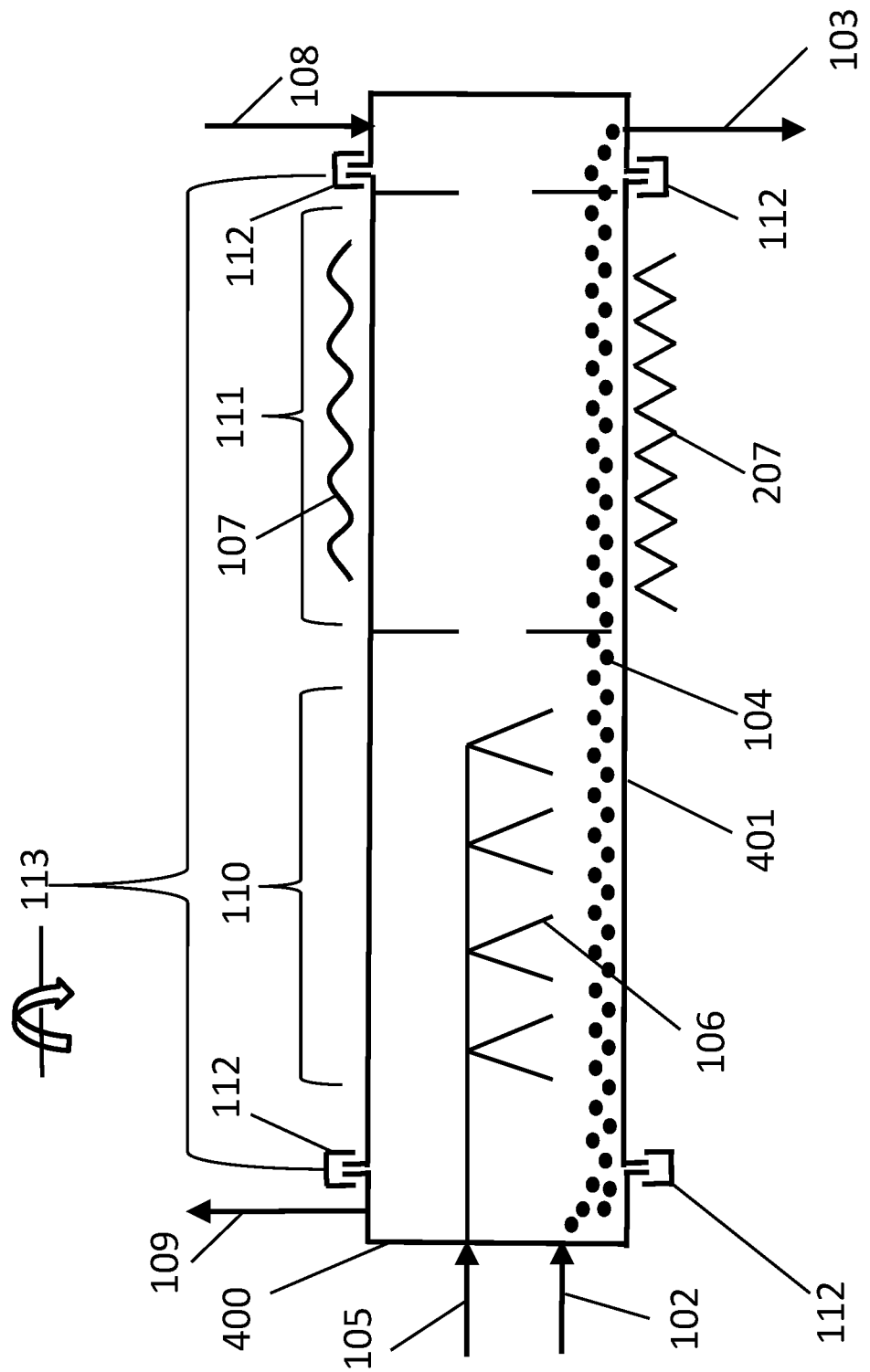
FIG. 4 is a schematic of a system for coating a material and drying the coating on the coated material using electromagnetic radiation and a heating source that heats a side wall of a coating container and/or internal container containing the coated material, according to embodiments of the invention.

Apparatuses are described herein that are capable of heating a coating container, internal container, material to be coated, solvent, and/or coated material with electromagnetic radiation, heat generated from a heat source that is positioned outside of the interior volume of a coating container containing the coated material, and/or heat generated from a heat source that heats an internal container for the coated material and/or material to be coated, the internal container positioned in the interior volume of the coating container. FIG. 1 is a non-limiting schematic of coating apparatus 100 for coating a material and drying the coating on coated material 104 using electromagnetic radiation from electromagnetic radiation source 107. FIG. 2 is a non-limiting schematic of coating apparatus 200 for coating a material and drying the coating on coated material 104 using heat source 207 external to an internal container of coating container 201 containing the coated material 104. FIG. 3 is a non-limiting schematic of a coating apparatus 300 for coating a material and drying the coating on coated material 104 using heat source 207 configured to heat an internal container for the coated material 104 and/or material to be coated, such as a rotating internal container 312. FIG. 4 is a non-limiting schematic of coating apparatus 400 for coating a material and drying the coating on coated material 104 using electromagnetic radiation from electromagnetic radiation source 107 and heat source 207 external to coating container 401 containing coated material 104. Heat source 207 of coating apparatus 400 may also or alternatively heat internal container 312 for coated material 104 and/or material to be coated (not shown), such as rotating internal container. Internal container 312 can be positioned in the interior volume of coating apparatus 400. The materials of construction, size, and shape of coating apparatuses 100, 200, 300, and 400 can be determined using standard engineering practice and/or modeling programs to achieve the maximum flow rates and appropriate contact time. Coating apparatuses 100, 200, 300, and 400 can include coating container 101, 201, 301, and/or 401. Coating containers 101, 201, 301, and 401 include material to be coated inlet 102 and coated material outlet 103. Coating apparatuses 100, 200, 300, and 400 may be adapted to move material to be coated and/or coated material 104 between material to be coated inlet 102 and coated material outlet 103. For example, in embodiments of the invention, coating container 101, 201, 301, and 401 may include a rotatable section 113 rotatably coupled to the apparatus through large mechanical seals 112, an internal container 312 coupled to a shaft 314 that is rotatably coupled to the apparatus through a small mechanical seal 313, and/or conveyor for moving material to be coated and coated material 104 through coating zone 110 and/or drying zone 111. In some embodiments, coating containers 101, 201, 301, and 401 are capable of agitating the material to be coated and/or coated material 104, and/or includes an apparatus that can cause such agitation. For example, coating containers 101, 201, 301, and 401 may include a rotatable section, a rotatable internal container, and/or a conveyor that vibrates. In some instances, the rotatable section and/or rotatable internal container may contain internal flights and/or be rotated to induce movement of the material to be coated and/or coated material. The coating material can be introduced through the coating material inlet 105. In some embodiments, the coating material can be distributed onto the material to be coated by sprayers 106.

Coating apparatuses 100 and 400 may include an electromagnetic radiation source 107 and coating apparatuses 100 and 400 may be configured such that coated material 104 may be exposed to heat generated from electromagnetic radiation from electromagnetic radiation source 107. In some embodiments, coating apparatuses 100 and 400 are configured to expose the material to be coated, coated material, a container, or an internal container with electromagnetic radiation from electromagnetic radiation source 107. One or more wavelengths of electromagnetic radiation can be used. In some instances, electromagnetic radiation source 107 is disposed internal to a coating container but outside of an internal container or external to a container such as 101, 201, 301, and 401. In some instances, the coating apparatuses 100 and 400 may be configured so that the coated material 104, internal container, and/or coating container is exposed to electromagnetic radiation from electromagnetic radiation source 107 in drying zone 111.

Coating apparatuses 200, 300, and 400 can include heat source 207 and coating apparatuses 200, 300, and 400 may be configured so that coated material 104 is exposed to heat from the heat source 207. Heat source 207 can be located external to the internal container 312, but internal to the coating container 301. In some instances, heat source 207 can be located external to and/or in a sidewall of coating containers 201 and 401. In some instances, coating apparatuses 200, 300, and 400 can be configured to expose coated material 104 with heat from heat source 207 in drying zone 111.

In some instances, drying zone 111 is downstream from a zone where the material to be coated is contacted with the coating material and/or solvent, and does not overlap coating zone 110 (See, for example, FIG. 1 and FIG. 4). In some embodiments, coating zone 110 and drying zone 111 overlap partially or completely (see FIG. 2 and FIG. 3).

Coating containers 101, 201, 301, and 401 contain sweep gas inlet 108 and solvent-enriched sweep gas outlet 109. In some instances, the sweep gas can be partially or completely fresh sweep gas, received directly from other processes, recycled, and/or received from a sweep gas recovery apparatus (See, for example FIG. 5A, FIG. 5B, FIG. 7, and FIG. 8). Sweep gas inlet 108 can be at a lower elevation or higher elevation than the location of some of coated material 104 to allow the sweep gas to flow in an upward or downward direction, respectively, and contact coated material 104. In some embodiments, flowing sweep gas upwardly in this way through material to be coated and coated material 104 may agitate these materials. As the sweep gas flows through coating apparatuses 100, 200, 300, and 400 it contacts coated material 104 and/or evaporated solvent, which helps to flow the solvent away from coated material 104 and out of coating apparatuses 100, 200, 300, and 400 through solvent-enriched sweep gas outlet 109. In some embodiments, the solvent-enriched sweep gas is further processed to reduce the amount of solvent therein to form a recovered sweep gas and/or an aqueous-enriched solvent solution (see for example FIG. 5A, FIG. 5B, and FIG. 8). The recovered sweep gas can be used as part or all of the sweep gas entering coating apparatuses 100, 200, 300, and 400 through sweep gas inlet 108. In some instances, at least a portion of the recovered sweep gas is used in other processes in the same or a different plant. The aqueous-enriched solvent solution can be used as part or all of the solvent entering coating apparatuses 100, 200, 300, and 400 through coating material inlet 105. In some instances, at least a portion of the aqueous-enriched solvent solution is used in other processes in the same or a different plant.

C. Process to Recover a Sweep Gas or to Recover a Sweep Gas and Obtain an Aqueous-Enriched Solvent Solution In some instances, the systems, apparatuses, and methods disclosed herein further include an apparatus and/or method to recover solvent from the solvent-enriched sweep gas and/or recover and/or recycle a recovered sweep gas from a solvent-enriched sweep gas. In some instances, the apparatus and/or method to recover solvent and/or sweep gas is an apparatus and/or method known in the art, such as the use of a conventional condenser, distillation, absorption column, etc.

Alternatively or additionally, the systems, apparatuses, and methods disclosed herein can recover solvent and sweep gas from a solvent enriched sweep gas. In some embodiments disclosed herein, some or all of the solvent from the solvent-enriched sweep gas can be condensed into a solution that contains more water than solvent, forming a solvent-enriched aqueous solution. In some embodiments, some or all of the solvent from the solvent-enriched sweep gas can be condensed into a solution that contains more solvent than water, forming an aqueous-enriched solvent solution. In some embodiments, a solvent-enriched aqueous solution and an aqueous-enriched solvent solution are both formed. In some instances, embodiments disclosed herein include the use of an aqueous liquid to recover and/or recycle a solvent and/or a sweep gas from a solvent-enriched sweep gas. The aqueous liquid can be used to condense and/or precipitate solvent out of the solvent-enriched sweep gas to form a recovered sweep gas. In some instances, the solvent reduced from the solvent-enriched sweep gas is condensed into the aqueous liquid forming a solvent-enriched aqueous solution. In some instances, solvent-enriched sweep gas is contacted by the aqueous liquid. In some instances, the solvent-enriched sweep gas is contacted by the aqueous liquid by combining in a packed bed and/or column, by bubbling the solvent-enriched sweep gas through the aqueous liquid, by spraying the aqueous liquid through the solvent-enriched sweep gas, by combining both the solvent-enriched sweep gas and the aqueous liquid in a porous matrix, etc., or any combination thereof.

In some instances, the aqueous liquid contains 1% to 100% weight/weight (wt/wt) or volume/volume (v/v) of water. In some instances, the amount of water in the aqueous liquid is 100%, 95%, 90%, 85%, 80%, 75%, 70%, 65%, 60%, 55%, 50%, 45%, 40%, 35%, 30%, 25%, 20%, 15%, 10%, 5%, 1%, less than 1% by weight or volume or any range therein. In some embodiments the aqueous liquid contains 50% to 100% wt/wt of water or any range or percentage therein. The amount of the water in the aqueous liquid can vary depending on the conditions and/or requirements of the process in which it is being used.

In some instances, the aqueous-enriched solvent solution contains a sufficiently low amount of water to be useful in a coating process for dissolving and/or carrying a coating material. In some instances, the aqueous-enriched solvent solution contains 10,000 parts per million (ppm) to 50 ppm water. In some instances, the amount of water in the aqueous-enriched solvent solution is more than 10,000 ppm, is 10,000, 9,000, 8,000, 7,000, 6,000, 5,000, 4,000, 3,000, 2,000, 1,000, 900, 800, 700, 600, 500, 400, 300, 200, 100, 90, 80, 70, 60, or 50 ppm, is less than 50 ppm, or any range therein. The amount of the water in the aqueous-enriched solvent solution can vary depending on the conditions and/or requirements of the process in which it is being created and/or being used.

In some instances, at least a portion of the recovered/recycled sweep gas is used as at least a portion of the sweep gas used to contact the evaporated solvent in the coating systems, apparatuses, and/or methods disclosed herein. In some instances, at least a portion of the aqueous-enriched solvent solution is used as at least a portion of the solvent used to contact the coating material in the coating systems, apparatuses, and/or methods disclosed herein.

D. Apparatus to Recover a Sweep Gas

Figure 8:
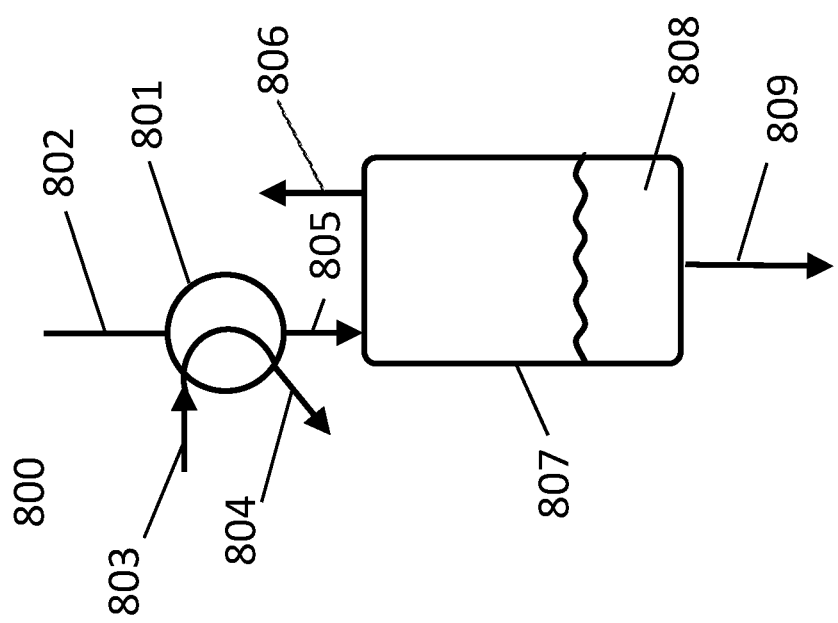
FIG. 8 is a schematic of a conventional system for condensing solvent out of a solvent-enriched sweep gas and recovering the sweep gas.

Apparatuses that are contemplated to be used herein include those known in the art that are capable of removing solvent from a solvent-enriched sweep gas, such as condenser, distillation, absorption column, etc. For example, FIG. 8 shows a non-limiting schematic of sweep gas recovery apparatus 800 for removing solvent from a solvent-enriched sweep gas using condenser 801 and phase separator 807 to form condensed solvent 808 and recovered sweep gas. The materials of construction, size, and shape of sweep gas recovery apparatus 800 can be determined using standard engineering practice and/or modeling programs to achieve the maximum flow rates and appropriate processing time.

In some instances, a solvent-enriched sweep gas can be removed from a coating apparatus and moved into condenser 801 through a solvent-enriched sweep gas line 802. In some instances, condenser 801 can condense part of or all of the solvent out of the solvent-enriched sweep gas to form a condensed solvent and a recovered sweep gas. In some instances, the condensed solvent and/or the recovered sweep gas can be removed from condenser 801. Condenser 801 can be any condenser known in the art. In some instances, condenser 801 uses a cooling liquid and/or gas to cool the solvent-enriched sweep gas. The cooling liquid and/or gas can enter the condenser through cooling fluid inlet 803 and exit condenser 801 through cooling fluid outlet 804. In some instances, condenser 801 uses cooling water as a cooling liquid.

In some instances, some or all of the products produced in condenser 801 can be removed from condenser 801 and moved into phase separator 807 through one or more condenser outlets, such as condenser outlet 805. In some instances, phase separator 807 is configured to separate gases, liquids, solvent, and/or an aqueous liquids into separate phases. In some instances, the phase separator separates condensed solvent 808 and recovered sweep gas. In some instances, condensed solvent 808 is removed from phase separator 807 through condensed solvent outlet 809. In some instances, recovered sweep gas is removed from the phase separator 807 through recovered sweep gas outlet 806.

In some instances, the solvent-enriched sweep gas can be received directly from other processes, such as, but not limited to, a coating process using apparatus such as those shown in FIG. 1, FIG. 2, FIG. 3, FIG. 4, and FIG. 7. In some instances, at least a portion of the condensed solvent and/or recovered sweep gas is used as at least a portion of the solvent and/or sweep gas, respectively, used to produce the coated material in the coating systems, apparatuses, and/or methods disclosed herein, such as those shown in FIG. 1, FIG. 2, FIG. 3, FIG. 4, and FIG. 7. In some instances, at least a portion of the condensed solvent and/or recovered sweep gas is used in other processes in the same or a different plant.

Figure 5A:
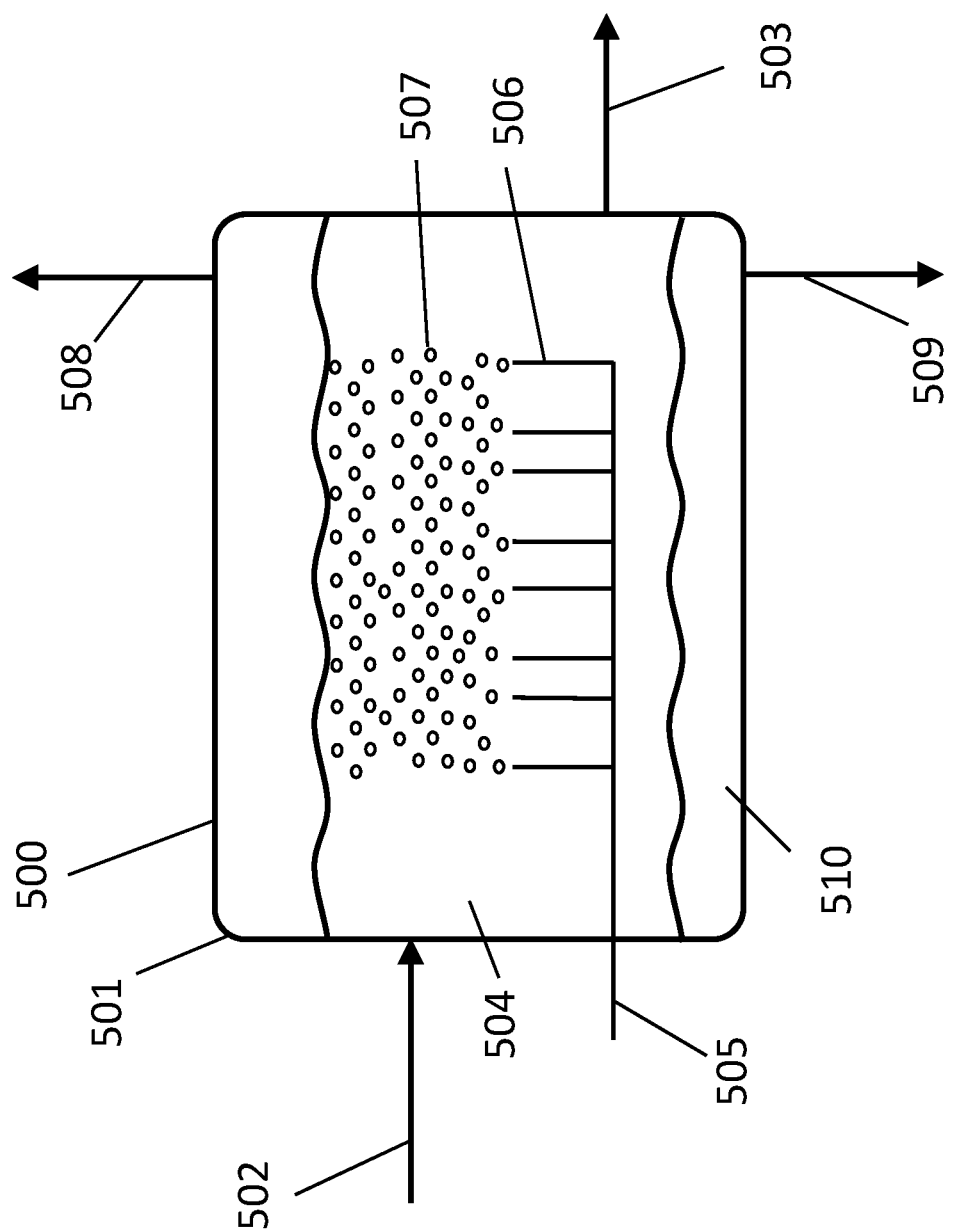
FIG. 5A is a schematic of a system for condensing solvent out of a solvent-enriched sweep gas and recovering the sweep gas using an aqueous liquid, according to embodiments of the invention.
Figure 5B:
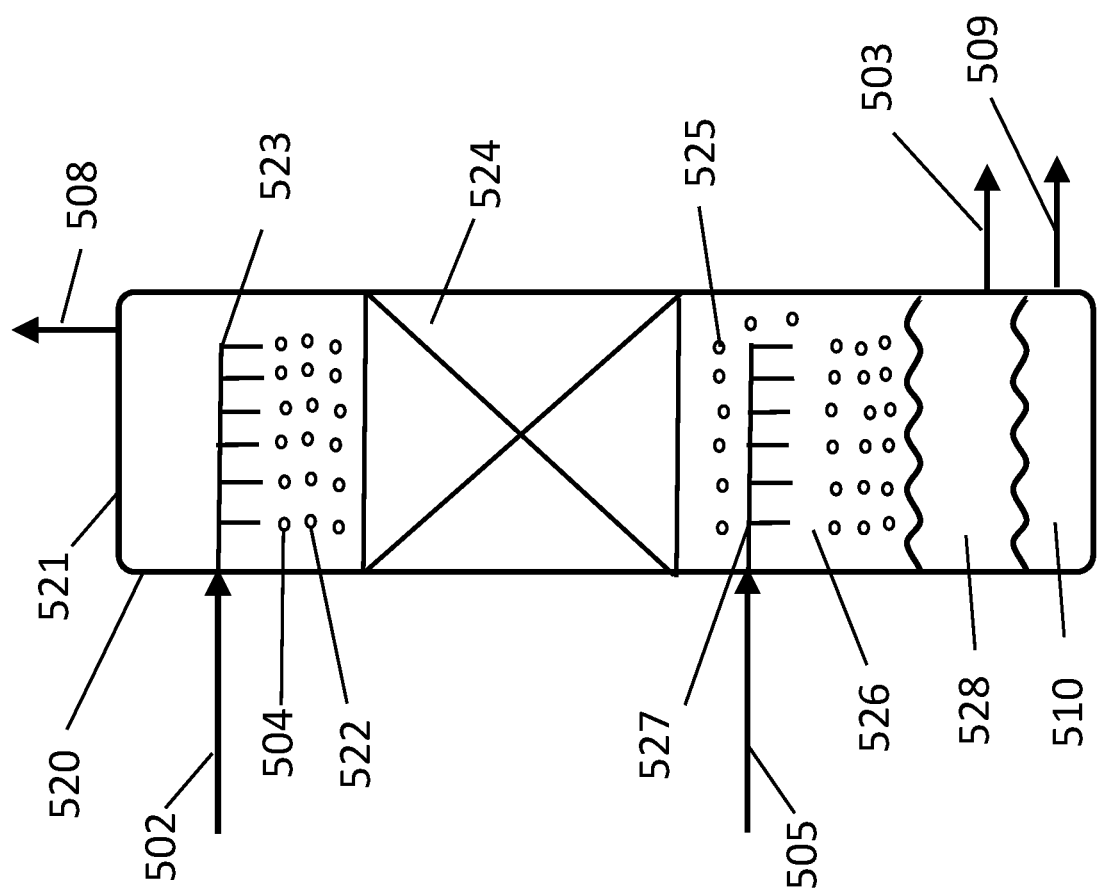
FIG. 5B is a schematic of a system for condensing solvent out of a solvent-enriched sweep gas and recovering the sweep gas using an aqueous liquid, according to embodiments of the invention.

E. Apparatus to Recover a Sweep Gas and Obtain an Aqueous-Enriched Solvent Solution Alternatively or additionally, other apparatuses are disclosed herein that are capable of removing solvent from a solvent-enriched sweep gas. For example, FIG. 5A and FIG. 5B show a non-limiting schematic of sweep gas recovery apparatuses 500 and 520, respectively, for removing solvent from a solvent-enriched sweep gas using aqueous liquid 504 to form a solvent-enriched aqueous solution, an aqueous-enriched solvent-solution, and a recovered sweep gas that has a reduced amount of solvent contained therein compared to the solvent-enriched sweep gas. The materials of construction, size, and shape of sweep gas recovery apparatuses 500 and 520 can be determined using standard engineering practice and/or modeling programs to achieve the maximum flow rates and appropriate contact time. Sweep gas recovery apparatuses 500 and 520 can include containers 501 and 521, respectively. Containers 501 and 521 may include solvent-enriched sweep gas inlet 505 and recovered sweep gas outlet 508. Containers 501 and 521 may be adapted to allow sweep gas 507 and 528, respectively, to flow from solvent-enriched sweep gas inlet 505 to recovered sweep gas outlet 508. Aqueous liquid 504 can be introduced through aqueous liquid inlet 502 and solvent-enriched aqueous solution can be removed from the sweep gas recovery apparatuses 500 and 520 by solvent-enriched aqueous solution outlet 503. Some solvent can remain in the solvent-enriched aqueous solution and some solvent can separate out of the solvent-enriched aqueous solution as aqueous-enriched solvent solution 510 that can be removed from sweep gas recovery apparatuses 500 and 520 by aqueous-enriched solvent solution outlet 509. Aqueous-enriched solvent solution 510 can form above or below the solvent-enriched aqueous solution depending on the density of the solutions. Thus, in some embodiments, the location of solvent-enriched aqueous solution outlet 503 is below aqueous-enriched solvent solution outlet 509.

Sweep gas recovery apparatus 500 (FIG. 5A) is configured to contact the solvent-enriched sweep gas with aqueous liquid 504. In some embodiments, the solvent-enriched sweep gas can be distributed into aqueous liquid by bubblers 506 to create bubbles of sweep gas 507 to increase the surface area of the sweep gas exposed to aqueous liquid 504. In some instances, bubblers 506 are not used. In some instances, the solvent-enriched sweep gas is contacted by the aqueous liquid in a packed bed, a packed column, a porous matrix, etc.

Sweep gas recovery apparatus 520 (FIG. 5B) is configured to contact aqueous liquid 504 with solvent-enriched sweep gas. In some instances, the solvent-enriched sweep gas 526 is the continuous phase in the container 521, and is distributed in the container by solvent-enriched gas distributor 527. In some embodiments, the aqueous liquid can be distributed into solvent-enriched sweep gas by aqueous sprayer 523 to form aqueous droplets 522. In some instances, the contact between the solvent-enriched sweep gas 526 and the aqueous liquid can be increased by passing solvent-enriched sweep gas 526 and aqueous liquid 504 through packed bed 524. In some instances, the contact between the solvent-enriched sweep gas and the aqueous liquid forms solvent-enriched aqueous droplets 525, which, in some embodiments, can combine to form a collectable reservoir of solvent-enriched aqueous solution 528. In some embodiments, aqueous-enriched solvent solution 510 may also form.

In some instances, the solvent-enriched sweep gas can be received directly from other processes, such as, but not limited to, a coating process using apparatus such as those shown in FIG. 1, FIG. 2, FIG. 3, FIG. 4, and FIG. 7. In some instances, the recovered sweep gas is used as all or part of the sweep gas used in another process, such as, a coating process using apparatus such as those shown in FIG. 1, FIG. 2, FIG. 3, FIG. 4, and FIG. 7. In some embodiments, the solvent-enriched aqueous solution is further processed to reduce the amount of solvent therein to form a recovered aqueous liquid (see FIG. 6A and FIG. 6B). In some instances, at least a portion of the recovered sweep gas is used in other processes in the same or a different plant, such as use in a fertilizer coating process. In some embodiments, the aqueous-enriched solvent solution can be further processed to reduce the amount of water in the solvent to form a recovered solvent. In some instances, at least a portion of the aqueous-enriched solvent solution and/or recovered solvent is used in other processes in the same or a different plant, such as use in a fertilizer coating process.

F. Process to Recover an Aqueous Liquid and/or Recover Solvent

In some instances, the systems, apparatuses, and methods disclosed herein further include an apparatus and/or method to recover and/or recycle a solvent and/or an aqueous liquid from a solvent-enriched aqueous solution. In some instances, the apparatus and/or method to recover and/or recycle a solvent and/or an aqueous liquid from a solvent-enriched aqueous solution is an apparatus and/or method known in the art. In some instances, the apparatus and/or method includes the use of a condenser, distillation, absorption column, etc.

Alternatively or additionally, other methods to recover and/or recycle a solvent and/or an aqueous liquid from a solvent-enriched aqueous solution are described herein. In some instances, embodiments include use of steam to recover a solvent ("recovered solvent") and/or recover an aqueous liquid ("recovered aqueous liquid") from a solvent-enriched aqueous solution. In some instances, the steam contacts the solvent-enriched aqueous solution to transform the dissolved and/or carried solvent in the solvent-enriched aqueous solution into a gas separable from the water. The solvent-enriched aqueous solution can be contacted by steam by any methods known in the art, such as, but not limited to, combining in a packed bed and/or column, bubbling the steam through the solvent-enriched aqueous solution, spraying a solvent-enriched aqueous solution through the steam, combining both the solvent-enriched aqueous solution and the steam in a porous matrix, etc., or any combination thereof. In some instances, the solvent separates spontaneously from the solvent-enriched aqueous solution. In some instances, the amount of water in the recovered solvent is further reduced by any methods known in the art, such as, but not limited to, physisorption and/or chemisorption. In some instances, the water is reduced by use of a molecular sieve and/or by the use of a chemical such as, but not limited to, sodium sulfate. In some instances, the solvent mixed with the exiting steam is recovered by any methods known in the art, such as, but not limited to, condensation and/or phase separation to produce a recovered solvent, an aqueous-enriched solvent solution, an aqueous liquid, and/or a solvent-enriched aqueous solution.

In some aspects of methods described herein, materials used in the processes, for example, solvents and aqueous solution that is used to capture the solvent, are recycled for reuse in the method. All or part of the materials used in the processes described herein can be recycled materials. For example, in some instances, at least a portion of the recovered aqueous liquid and/or solvent-enriched aqueous solution is used as at least a portion of the aqueous liquid used to reduce the amount of solvent in the solvent-enriched sweep gas in the sweep gas recovery systems, apparatuses, and/or methods disclosed herein. In some instances, at least a portion of the recovered aqueous liquid and/or solvent-enriched aqueous solution is used in other processes in the same or a different plant. In some instances, at least a portion of the recovered solvent and/or aqueous-enriched solvent solution is used as at least a portion of the solvent used to produce the coated material in the coating systems, apparatuses, and/or methods disclosed herein. In some instances, at least a portion of the recovered solvent stream and/or aqueous-enriched solvent solution is used in other processes in the same or a different plant.

G. Apparatus to Recover Solvent and/or Recover an Aqueous liquid

Figure 6A:
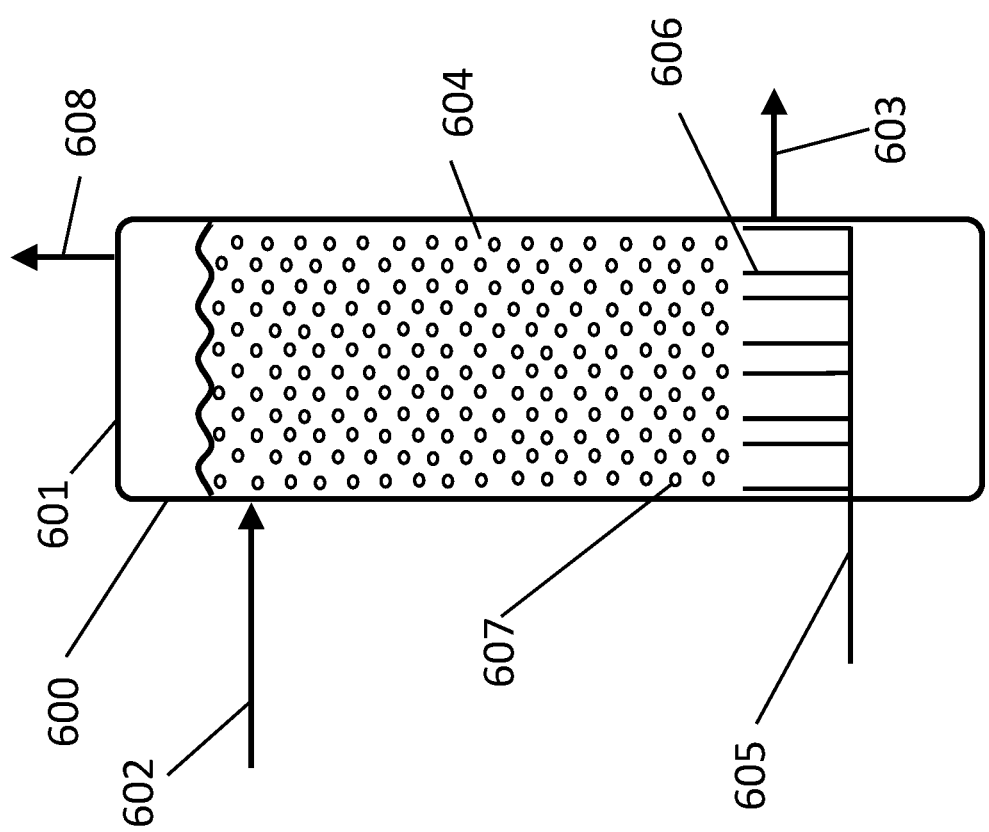
FIG. 6A is a schematic of a system for using steam to recover a solvent and an aqueous liquid from an aqueous solution enriched in the solvent, according to embodiments of the invention.
Figure 6B:
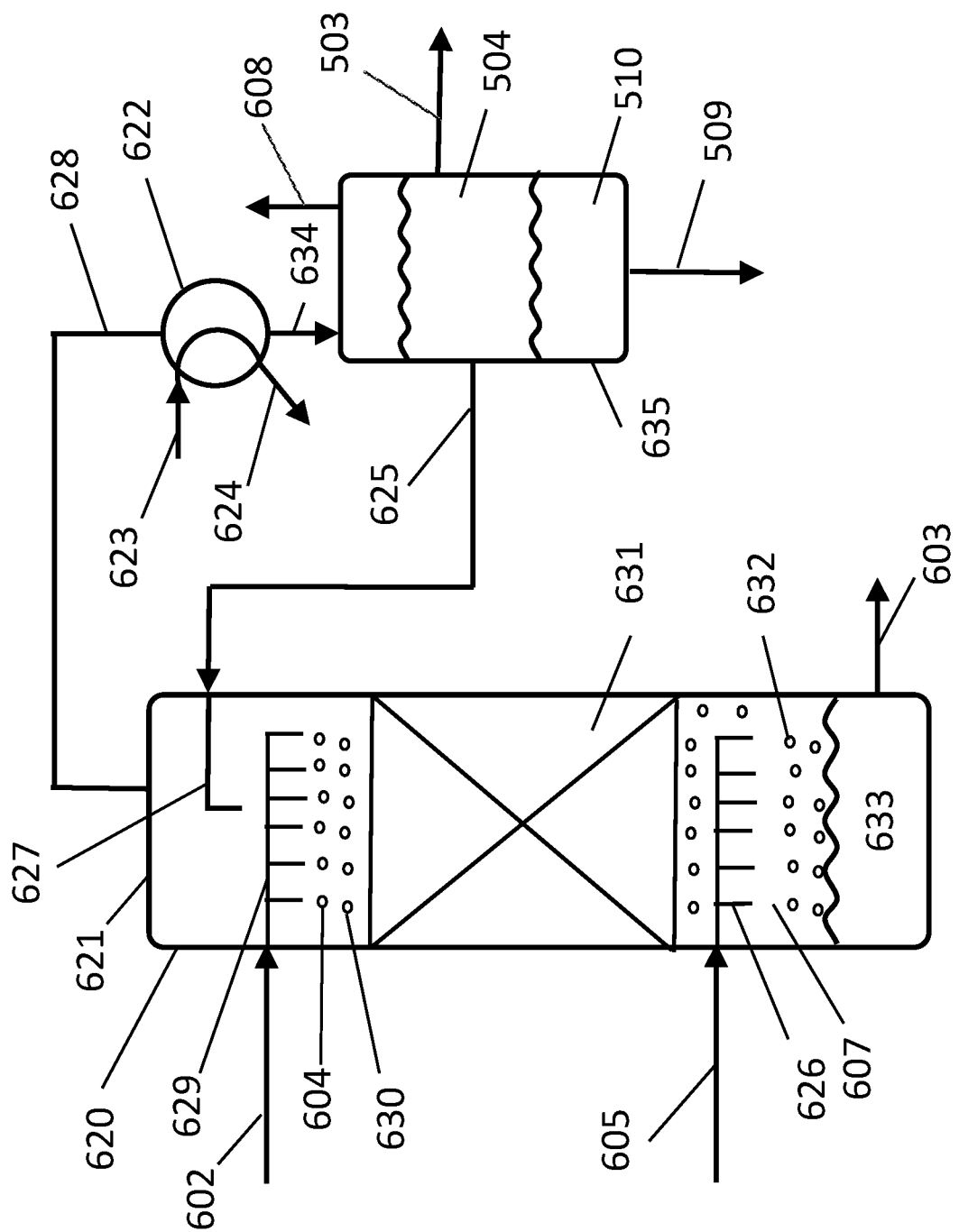
FIG. 6B is a schematic of a system for using steam to recover a solvent and an aqueous liquid from an aqueous solution enriched in the solvent, according to embodiments of the invention.

The apparatuses described herein are capable of removing solvent from a solvent-enriched aqueous solution. FIG. 6A and FIG. 6B are non-limiting schematic of aqueous liquid recovery and/or solvent recovery apparatuses ("A/S recovery apparatus") 600 and 620, respectively, for removing solvent from solvent-enriched aqueous solution 604 using steam 607 to form a recovered aqueous liquid that has a reduced amount of solvent contained therein, an aqueous-enriched solvent solution, and/or recovered solvent that has a reduced amount of water contained therein. The materials of construction, size, and shape of A/S recovery apparatuses 600 and 620 can be determined using standard engineering practice and/or modeling programs to achieve the maximum flow rates and appropriate contact time. A/S recovery apparatuses 600 and 620 can include containers 601 and 621, respectively. Containers 601 and 602 may include solvent-enriched aqueous solution inlet 602, recovered aqueous liquid outlet 603, and are capable of having solvent-enriched aqueous solution 604 move from solvent-enriched aqueous solution inlet 602 to the recovered aqueous liquid outlet 603, for example, by flow due to gravity. Steam 607 can be introduced through steam inlet 605 and recovered solvent and/or a mixture of vaporous solvent and steam can be removed from A/S recovery containers 601 and 621 through recovered solvent outlet 608 or overhead line 628. Recovered solvent can be removed from A/S recovery apparatuses 600 and 620 through recovered solvent outlet 608.

A/S recovery apparatus 600 (FIG. 6A) may be configured to contact solvent-enriched aqueous solution 604 with steam 607. In some embodiments, steam 607 can be distributed into the solvent-enriched aqueous solution by bubblers 606 to create bubbles of steam 607 to increase the surface area of solvent-enriched aqueous solution 604 exposed to steam 607. In some instances, bubblers 606 are not used. In some instances, the solvent-enriched aqueous solution is contacted by steam in a packed bed, a packed column, a porous matrix, etc.

A/S recovery apparatus 620 (FIG. 6B) may be configured to contact steam 607 with solvent-enriched aqueous solution 604. In some instances, the A/S recovery apparatus 620 is a steam stripping apparatus and container 621 is a steam stripping column. In some embodiments, steam 607 is the continuous phase in the container 621, and is distributed in the container by steam sparger 626. In some embodiments, the solvent-enriched aqueous solution can be distributed in the steam by solvent-enriched aqueous solution sprayer 629 to form solvent-enriched aqueous solution droplets 630. In some instances, the contact between the steam 607 and the solvent-enriched aqueous solution 604 is increased by passing the steam 607 and the solvent-enriched aqueous solution 604 through a packed bed 631. In some instances, the contact between the steam and the solvent-enriched aqueous solution forms solvent free aqueous liquid droplets 632, which, in some embodiments, may combine to form a collectable reservoir of recovered aqueous liquid 633.

To minimize solvent losses from the system an A/S recovery apparatus may also be configured to condense and phase separate solvent from a steam/solvent mixture produced in the A/S recovery container. In some instances, A/S recovery apparatuses 600 and 620 can be configured to condense and phase separate solvent from a steam/solvent mixture (see for example FIG. 6B). In some instances, a steam/solvent mixture can be removed from a A/S recovery apparatus and moved into a condenser 622 through an overhead line 628. In some instances, the condenser 622 can condense part of or all of the solvent, part of or all of the steam, and/or part of or all of the both the steam and solvent out of the steam/solvent mixture to form a condensed steam, a condensed solvent, and/or steam/solvent mixture, respectively. In some instances, the condensed solvent, the condensed steam, the condensed steam/solvent mixture, the remaining steam, the remaining gas phase solvent, and/or the remaining steam/solvent mixture can be removed from the condenser 622. The condenser 622 can be any condenser known in the art. In some instances, the condenser 622 uses a cooling liquid and/or gas to cool the steam/solvent mixture. The cooling liquid and/or gas can enter the condenser through cooling fluid inlet 623 and exit the condenser 622 through cooling fluid outlet 624. In some instances, the condenser 622 uses cooling water as a cooling liquid.

In some instances, some or all of the products produced in the condenser 622 can be removed from the condenser 622 and moved into a phase separator 635 through one or more condenser outlets, such as condenser outlet 634. In some instances, the phase separator 635 is configured to separate gases, liquids, solvent, and/or an aqueous liquid into separate phases. In some instances, the phase separator separates recovered solvent, aqueous liquid 504, and/or aqueous-enriched solvent solution 510. In some instances, the recovered solvent is removed from the phase separator 635 through recovered solvent outlet 608. In some instances, aqueous liquid 504 is removed from the phase separator 635 through solvent-enriched aqueous solution outlet 503. In some instances, all or part of the aqueous liquid 504 is removed from the phase separator 635 through reflux line 625. In some instances, the reflux line 625 is configured to move aqueous liquid 504 into a A/S recovery apparatus, such as A/S recovery apparatuses 600 and/or 621 to remove additional solvent from the aqueous liquid. In some instances, the aqueous liquid 504 is distributed in the A/S recovery apparatus through a reflux sprayer 627. In some instances, the aqueous-enriched solvent solution 510 is removed from the phase separator 635 through aqueous-enriched solvent solution outlet 509.

Figure 7:
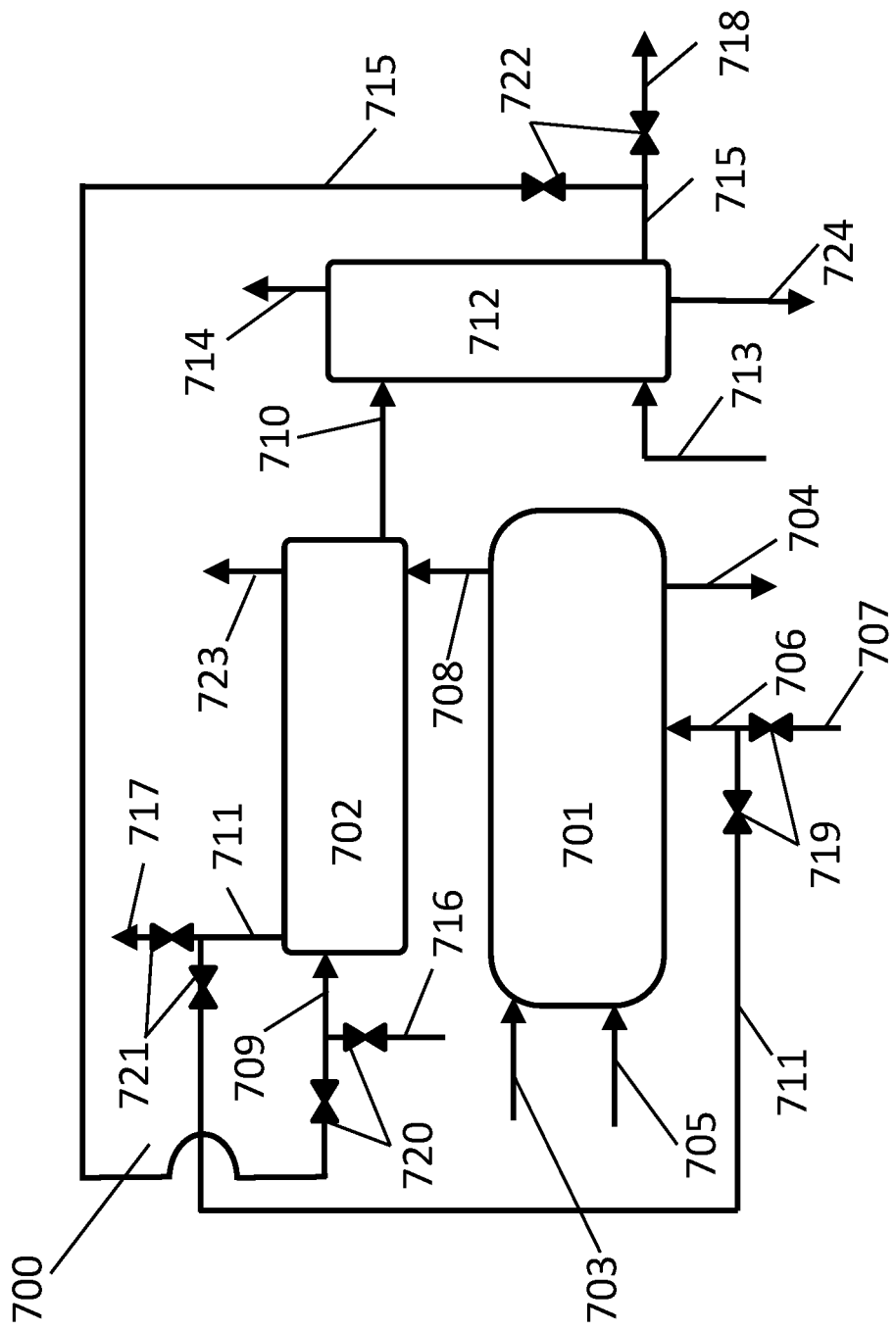
FIG. 7 is a schematic of a system for coating a material and recovering and recycling a sweep gas used in the process, recovering the solvent evaporated from the coating material, and recovering and recycling an aqueous liquid used in recovering the sweep gas, according to embodiments of the invention.

In some instances, the solvent-enriched aqueous solution can be received directly from other processes, such as, but not limited to, a sweep gas recovery process implemented by, for example, apparatus shown in FIG. 5A, FIG. 5B, and FIG. 7. In some instances, the recovered solvent, aqueous-enriched solvent solution, and/or condensed solvent is used as all or part of the solvent used in another process, such as, but not limited to, a coating process implemented by, for example, apparatus shown in FIG. 1, FIG. 2, FIG. 3, FIG. 4, and FIG. 7. In some embodiments, the recovered solvent, aqueous-enriched solvent solution, and/or condensed solvent is further processed to reduce the amount of water therein. In some instances, the recovered aqueous liquid and/or condensed steam is used as all or part of the aqueous liquid used in another process, such as, but not limited to, a sweep gas recovery apparatus (see for example FIG. 5A, FIG. 5B, and FIG. 7). In some embodiments, the solvent-enriched aqueous solution and/or condensed steam are processed again through the same or a separate A/S recovery apparatus.

H. Combinations of Apparatuses

Compared to conventional systems, apparatuses, and methods, the systems, apparatuses, and methods, according to embodiments of the invention described herein require less energy, maintenance, total sweep gas, fresh sweep gas, and/or fresh solvent to produce a coated material and/or any of the products, byproducts, and/or intermediate products thereof. The systems, apparatuses, and methods, according to embodiments of the invention, can use any one, or a combination of, the systems, apparatuses, and methods disclosed herein.

Embodiments of the invention may include a combination of a coating apparatus, a sweep gas recovery apparatus, and an A/S recovery apparatus disclosed herein. As a non-limiting example, referring to FIG. 7, coating apparatus 701, sweep gas recovery apparatus 702, and A/S recovery apparatus 712 can be used in combination in system 700 for producing coated material. Coating apparatus 701, sweep gas recovery apparatus 702, and A/S recovery apparatus 712 can be any one of the respective apparatuses disclosed herein.

A material to be coated can be coated by using coating apparatus 701 of the system 700. A material to be coated, a coating material, and a sweep gas can enter coating apparatus 701 through material to be coated inlet 703, coating material inlet 705, and sweep gas inlet 706, respectively. The sweep gas can be fresh sweep gas (e.g., non-recycled/non-recovered sweep gas) and/or recovered sweep gas. Fresh sweep gas can be supplied to sweep gas inlet 706 through fresh sweep gas line 707. Recovered sweep gas can be supplied to sweep gas inlet 706 through recovered sweep gas line 711. The amount of fresh sweep gas and/or recovered sweep gas can be optionally controlled through optional valves 719 and 721. A coated material and/or solvent-enriched sweep gas can be produced by coating apparatus 701 by any of the methods disclosed herein. The coated material and the solvent-enriched sweep gas can be removed from the coating apparatus 701 through coated material outlet 704 and solvent-enriched sweep gas line 708, respectively.

The solvent in the solvent-enriched sweep gas can be reduced to produce a recovered sweep gas by using sweep gas recovery apparatus 702 of system 700. In some instances, the sweep gas recovery apparatus 702 can be any sweep gas recovery known in the art, such as condensers, distillers, absorption columns, etc. In some instances, the sweep gas recovery apparatus 702 can be any of the sweep gas recovery apparatus disclosed herein and/or use any of the sweep gas recovery methods disclosed herein. In some instances, solvent-enriched sweep gas and an aqueous liquid can enter sweep gas recovery apparatus 702 through solvent-enriched sweep gas line 708 and aqueous liquid inlet 709, respectively. The aqueous liquid can be fresh aqueous liquid (e.g., non-recycled/non-recovered aqueous liquid) and/or recovered aqueous liquid. Fresh aqueous liquid can be supplied to aqueous liquid inlet 709 through fresh aqueous liquid line 716. Recovered aqueous liquid can be supplied to aqueous liquid inlet 709 through recovered aqueous liquid line 715. The amount of fresh aqueous liquid and/or recovered aqueous liquid can be optionally controlled through optional valves 720 and 722. A recovered sweep gas, a solvent-enriched aqueous solution, and an aqueous-enriched solvent solution can be produced by sweep gas recovery apparatus 702 by any of the methods disclosed herein. The solvent-enriched aqueous solution, the aqueous-enriched solvent solution, and the recovered sweep gas can be removed from sweep gas recovery apparatus 702 through, respectively, solvent-enriched aqueous solution line 710, aqueous-enriched solvent solution line 723, and recovered sweep gas line 711 and/or recovered gas outlet 717. The recovered sweep gas can be used as part or all of the sweep gas used in coating apparatus 701. In some instances, at least a portion of the recovered sweep gas is used in other processes in the same or a different plant. The aqueous-enriched solvent solution can be used as part or all of the solvent used in coating apparatus 701 (not shown). In some instances, at least a portion of the aqueous-enriched solvent solution is used in other processes in the same or a different plant and/or the water is further reduced from the aqueous-enriched solvent solution to form a solvent.

The solvent in the solvent-enriched aqueous solution can be reduced to produce a recovered aqueous liquid, an aqueous-enriched solvent solution, and/or a recovered solvent by using A/S recovery apparatus 712 of system 700. In some instances, the A/S recovery apparatus can be any solvent recovery system known in the art, such as condensers, distillers, absorption columns, etc. In some instances, the A/S recovery apparatus 712 can be any of the A/S recovery apparatuses disclosed herein and/or use any of the methods disclosed herein. In some instances, the solvent-enriched aqueous solution and steam can enter A/S recovery apparatus 712 through the solvent-enriched aqueous solution line 710 and the steam inlet 713, respectively. The recovered solvent, the aqueous-enriched solvent solution, and the recovered aqueous liquid can be removed from A/S recovery apparatus 712, respectively, through the recovered solvent line 714, aqueous-enriched solvent solution line 724, and recovered aqueous liquid line 715 and/or recovered aqueous liquid outlet 718. The recovered aqueous liquid can be used as part or all of the aqueous liquid used in sweep gas recovery apparatus 702. The recovered solvent and optional aqueous-enriched solvent solution can be used as all or part of the solvent used in coating apparatus 701. In some instances, at least a portion of the recovered solvent stream, at least a portion of the aqueous-enriched solvent solution, and/or at least a portion of the recovered aqueous liquid is used in other processes in the same or a different plant and/or are further refined.

While the apparatuses in FIGS. 1-7 are shown as stand-alone apparatuses, it should be understood that the apparatuses can be portions or zones in a production apparatus, be housed in the same apparatus and/or structure. All of the apparatuses disclosed herein can also include valves, thermocouples, controllers (automated or manual controllers), computers or any other equipment deemed necessary to control or operate the apparatuses. The processing conditions in the apparatuses and systems disclosed herein can be varied to achieve a desired result (e.g., producing a product, intermediate, or stream with specific properties). The processing conditions may include temperature, pressure, flow of the materials entering and exiting the apparatus, location of components, location of apparatuses, wavelengths used, heat sources used, etc. or any combination thereof.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

The methods of coating a material described herein can reduce the amount of sweep gas required to produce a coated material in a process for coating a material. Specifically, the heat provided by an external heat source, by a heat source internal to a coating container but external to an internal container containing the coated material, and/or by an electromagnetic energy source that heats the coated material, coating container, and/or internal container ("coating processes disclosed herein") can be used to drive the evaporation of the solvent from the coated material. In this way the sweep gas is not the only source of heat and/or the main source of heat for the evaporation of the solvent from the coated material. It has been demonstrated by computer simulation that using the coating process disclosed herein can reduce the amount of sweep gas to one third or less of that required by conventional methods that use heated sweep gas as the heat source.

For both the modeled coating processes disclosed herein and the conventional coating process, the computer simulation modeled a fertilizer coating system that used $N_2$ and/or air as a sweep gas, approximately 4.4 tons/hour of a coating solution containing approximately 5% polymer and 95% of solvent, and approximately 6 tons/hour of urea. Both systems used approximately 3 tons/hour of fresh sweep gas and used additional recycled sweep gas with a solvent concentration of approximately 25% by weight when entering a fertilizer coating process. The solvent was condensed out of the solvent-enriched sweep gas to form a recycled sweep gas by using a modeled conventional solvent recovery condenser.

When compared to the conventional coating process, a coating process disclosed herein used less recycled sweep gas and more of the solvent condenser's duty could be dedicated to condensing solvent from the solvent-enriched sweep gas instead of cooling the solvent-enriched sweep gas. Specifically, the conventional coating process required over six times the amount of recycled sweep gas as compared to the coating processes disclosed herein (approximately 28.7 tons/hour at 114° C. vs. 4.2 tons/hour at 100° C.). Thus, the conventional coating process also produced over three times the amount of solvent-enriched sweep gas (approximately 35.7 tons/hour vs. 11.1 tons/hour). Also, the solvent-enriched sweep gas produced by the conventional coating process carried less solvent as a percentage than the coating processes disclosed herein (approximately 34% at 75° C. vs. 52% at 75° C.).

Over two times more of the conventional condenser's duty was required to cool the solvent-enriched sweep gas in the conventional coating process when compared to a coating process disclosed herein (approximately 69% vs. 33%). Accordingly, for the conventional coating process, over two times less of the condenser's duty was able to be used to actually condense solvent from the solvent-enriched sweep gas as compared to a coating process disclosed herein (approximately 31% vs. 66%). However, it is expected that it will be easier to condense solvent from the solvent-enriched sweep gas produced by a coating process disclosed herein because of the higher percentage of solvent carried in the solvent-enriched sweep gas.

These results demonstrate that using the systems, apparatuses, and methods disclosed herein can reduce the capital expenses, reduce operational costs, reduce the environmental impact, and/or increase the efficiency of fertilizer coating systems.

All of the methods disclosed and claimed herein can be made and executed without undue experimentation in light of the present disclosure. While the apparatuses and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain components which are functionally related may be substituted for the components described herein while the same or similar results would be achieved. All such similar substitutes and modifications apparent to those skilled in the art are deemed to be within the spirit, scope and concept of the invention as defined by the appended claims.

The invention claimed is:

1. A method for coating a material, the method comprising:
    (a) contacting the material with a coating material and a solvent to obtain a coated material;
    (b) evaporating the solvent from the coated material in an interior volume of a coating container having a side wall by heating the coated material, the coating container, and/or an internal container configured to hold coated and/or uncoated material positioned in the interior volume of the coating container (i) with electromagnetic radiation generated from an electric electromagnetic source, (ii) with heat generated from an external heat source positioned outside of the interior volume of the coating container and configured to heat a portion of the side wall of the coating container and/or the internal container, and/or (iii) with heat that heats the internal container, the heat being generated from a heat source positioned in the interior volume of the coating container and external to the internal container;

(c) removing the evaporated solvent from the interior volume of the coating container by contacting the evaporated solvent with a sweep gas to produce a solvent-enriched sweep gas and removing the solvent-enriched sweep gas from the interior volume of the coating container; and (d) removing at least a portion of the solvent from the solvent-enriched sweep gas by contacting the solvent-enriched sweep gas with an aqueous liquid comprising 50% wt/wt or more water to condense the solvent into the aqueous liquid to form a solvent-enriched aqueous solution, wherein the material to be coated and/or the coating material in step (a) comprises a fertilizer, and wherein the solvent is chloroform, toluene, methylene chloride, acetonitrile, chlorobenzene, 1,1,2-tricholoro-ethane, dichlorobenzene, methylethyl ketone, or any combination thereof.

2. The method of claim 1, wherein the amount of sweep gas used to remove the evaporated solvent is 0.8 MT of sweep gas/(hr×MT of material to be coated) to 2.5 MT of sweep gas/(hr×MT of material to be coated).

3. The method of claim 1, wherein the sweep gas has a temperature below 40° C.

4. The method of claim 1, wherein the temperature of the sweep gas is 40° C. to 150° C. prior to contacting the evaporated solvent.

5. The method of claim 1, wherein the coated material is contacted with the electromagnetic radiation to evaporate the solvent from the coated material and the electromagnetic radiation comprises ultraviolet radiation and/or infrared radiation.

6. The method of claim 1, wherein the coated material is contacted with the electromagnetic radiation to evaporate the solvent from the coated material and the electric electromagnetic source is positioned downstream from where the coating material contacts the material to be coated in step (a).

7. The method of claim 1, wherein the coated material is contacted with heat generated from the heat source that is positioned outside of the interior volume of the coating container to evaporate the solvent and the heat source is positioned downstream from where the coating material contacts the material to be coated in step (a).

8. The method of claim 1, wherein the coated material is contacted with heat that heats the internal container, the heat being generated from the heat source positioned in the interior volume of the coating container and external to the internal container, and wherein the heat source is positioned downstream from where the coating material contacts the material to be coated in step (a).

9. The method of claim 1, wherein the coating container, the internal container, or a portion of the coating container or the internal container rotates and/or oscillates during at least coating step (a) and heating step (b).

10. The method of claim 1, further comprising separating the condensed solvent from the solvent-enriched aqueous solution to form a recovered solvent stream and a recovered aqueous liquid.

11. The method of claim 10, further comprising using at least a portion of the recovered solvent stream in coating step (a).

12. The method of claim 10, further comprising using at least a portion of the recovered aqueous liquid as at least a portion of the aqueous liquid comprising water used to condense the evaporated solvent.

13. The method of claim 1, wherein the condensed solvent is separated from the solvent-enriched aqueous solution by contacting the solvent-enriched aqueous solution with steam to evaporate the condensed solvent.

14. The method of claim 1, wherein the sweep gas comprises nitrogen ($N_2$), argon (Ar), helium (He), carbon dioxide ($CO_2$), oxygen ($O_2$), air, flue gas, or any mixture or blend thereof.

15. The method of claim 1, wherein the solvent is an organic solvent.

16. The method of claim 1, wherein the coated material is a particulate.

17. The method of claim 1, wherein the fertilizer comprises urea.

18. A method for coating a material, the method comprising:

(a) contacting the material with a coating material and a solvent to obtain a coated material;

(b) evaporating the solvent from the coated material in an interior volume of a coating container having a side wall by heating the coated material, the coating container, and/or an internal container configured to hold coated and/or uncoated material positioned in the interior volume of the coating container (i) with electromagnetic radiation generated from an electric electromagnetic source, (ii) with heat generated from an external heat source positioned outside of the interior volume of the coating container and configured to heat a portion of the side wall of the coating container and/or the internal container, and/or (iii) with heat that heats the internal container, the heat being generated from a heat source positioned in the interior volume of the coating container and external to the internal container;

(c) removing the evaporated solvent from the interior volume of the coating container by contacting the evaporated solvent with a sweep gas to produce a solvent-enriched sweep gas and removing the solvent-enriched sweep gas from the interior volume of the coating container; and (d) removing at least a portion of the solvent from the solvent-enriched sweep gas by contacting the solvent-enriched sweep gas with an aqueous liquid comprising 50% wt/wt or more water to condense the solvent into the aqueous liquid to form a solvent-enriched aqueous solution, wherein the sweep gas has a temperature below 40° C., and wherein the solvent is chloroform, toluene, methylene chloride, acetonitrile, chlorobenzene, 1,1,2-trichloro-ethane, dichlorobenzene, methylethyl ketone, or any combination thereof.

* * * * *